United States Patent
Kim et al.

(10) Patent No.: US 9,456,196 B2
(45) Date of Patent: Sep. 27, 2016

(54) METHOD AND APPARATUS FOR PROVIDING A MULTI-VIEW STILL IMAGE SERVICE, AND METHOD AND APPARATUS FOR RECEIVING A MULTI-VIEW STILL IMAGE SERVICE

(75) Inventors: Yong-tae Kim, Seoul (KR); Ha-joong Park, Suwon-si (KR); Gun-ill Lee, Seoul (KR); Houng-sog Min, Ansan-si (KR); Sung-bin Hong, Yongin-si (KR); Kwang-cheol Choi, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 434 days.

(21) Appl. No.: 13/580,895

(22) PCT Filed: Feb. 23, 2011

(86) PCT No.: PCT/KR2011/001271
§ 371 (c)(1),
(2), (4) Date: Aug. 28, 2012

(87) PCT Pub. No.: WO2011/105814
PCT Pub. Date: Sep. 1, 2011

(65) Prior Publication Data
US 2012/0314937 A1    Dec. 13, 2012

Related U.S. Application Data

(60) Provisional application No. 61/282,510, filed on Feb. 23, 2010.

(51) Int. Cl.
*G06K 9/00* (2006.01)
*H04N 13/00* (2006.01)

(52) U.S. Cl.
CPC ...... *H04N 13/0066* (2013.01); *H04N 13/0033* (2013.01); *H04N 13/0048* (2013.01); *H04N 13/0059* (2013.01)

(58) Field of Classification Search
None
See application file for complete search history.

(56) References Cited

U.S. PATENT DOCUMENTS 6,862,374 B1 *  3/2005  Nagai et al. ............. 382/285
7,480,398 B2 *  1/2009  Kleen et al. ............. 382/128
(Continued)

FOREIGN PATENT DOCUMENTS

| JP | 200047558 A | 2/2000 |
| KR | 1020050100895 A | 10/2005 |
| KR | 1020070036542 A | 4/2007 |

OTHER PUBLICATIONS

International Search Report dated Nov. 22, 2011 from the International Searching Authority in counterpart application No. PCT/KR2011/001271.

(Continued)

*Primary Examiner* — Vikkram Bali
(74) *Attorney, Agent, or Firm* — Sughrue Mion, PLLC

(57) ABSTRACT

Provided are an apparatus and a method of providing a multiview still image service. The method includes: configuring a multiview still image file format including a plurality of image areas into which a plurality of pieces of image information forming a multiview still image are inserted; inserting the plurality of pieces of image information into the plurality of image areas, respectively; inserting three-dimensional (3D) basic attribute information to three-dimensionally reproduce the multiview still image into a first image area of the plurality of image areas into which main-view image information from among the plurality of pieces of image information is inserted; and outputting multiview still image data comprising the plurality of pieces of image information based on the multiview still image file format.

25 Claims, 18 Drawing Sheets

(56) References Cited

U.S. PATENT DOCUMENTS

| | | | |
|---|---|---|---|
| 7,643,671 B2* | 1/2010 | Dong et al. | 382/154 |
| 7,720,308 B2* | 5/2010 | Kitaura et al. | 382/285 |
| 7,738,733 B2* | 6/2010 | DePue et al. | 382/285 |
| 8,250,480 B2* | 8/2012 | Barnes et al. | 715/764 |
| 8,384,764 B2* | 2/2013 | Kim | H04N 19/597 348/42 |
| 8,682,107 B2* | 3/2014 | Yoon et al. | 382/286 |
| 2002/0159108 A1 | 10/2002 | Baba et al. | |
| 2005/0058327 A1* | 3/2005 | Pieper | 382/128 |
| 2008/0137929 A1* | 6/2008 | Chen et al. | 382/131 |
| 2008/0170806 A1* | 7/2008 | Kim | 382/285 |
| 2009/0060273 A1* | 3/2009 | Stephan et al. | 382/103 |
| 2009/0219282 A1* | 9/2009 | Kim et al. | 345/419 |
| 2011/0142329 A1* | 6/2011 | Sung et al. | 382/154 |
| 2012/0155750 A1* | 6/2012 | Kim et al. | 382/154 |

OTHER PUBLICATIONS

Written Opinion dated Nov. 22, 2011 from the International Searching Authority in counterpart application No. PCT/KR2011/001271.

* cited by examiner

METHOD AND APPARATUS FOR PROVIDING A MULTI-VIEW STILL IMAGE SERVICE, AND METHOD AND APPARATUS FOR RECEIVING A MULTI-VIEW STILL IMAGE SERVICE

CROSS-REFERENCE TO RELATED PATENT APPLICATIONS

This application is a National Stage application under 35 U.S.C. §371 of PCT/KR2011/001271 filed on Feb. 23, 2011, which claims the benefit of U.S. Provisional Patent Application No. 61/282,510, filed on Feb. 23, 2010 in the U.S. Patent and Trademark Office, all the disclosures of which are incorporated herein in their entireties by reference.

BACKGROUND

1. Field

Apparatuses and methods consistent with exemplary embodiments relate to providing and receiving a multiview still image service.

2. Description of the Related Art

A Joint Photographic Coding Experts Group (JPEG) file format is widely used as a file format for still images. Still image data based on the JPEG file format starts with a Start of Image (SOI) marker and ends with an End of Image (EOI) marker, and compressed data of a still image and information about the still image data are stored between the SOI marker and the EOI marker.

A Stereoscopic Video Application Format (SVAF) of the Moving Picture Experts Group (MPEG) has been developed as a three-dimensional (3D) video format. The SVAF format is based on an International Organization for Standardization (ISO) media file format. The ISO media file format includes an 'mdia' box (i.e., a media data box) for storing media data, and a 'moov' box (i.e., a movie box) for storing information about contents stored in the 'mdia' box. The SVAF format stores 3D video data in the 'mdia' box.

SUMMARY

One or more exemplary embodiments provide a multiview still image file format for efficiently transmitting and receiving image information about multiple view still images forming a multiview still image, and various types of information for three-dimensional (3D) reproduction of the multiview still image, and provide a multiview still image service for providing and receiving the multiview still image file format.

According to an aspect of an exemplary embodiment, there is provided a method of providing a multiview still image service, the method including operations of: configuring a multiview still image file format including a plurality of image areas into which a plurality of pieces of image information forming a multiview still image are inserted; inserting the plurality of pieces of image information into the plurality of image areas, respectively; inserting 3D basic attribute information to three-dimensionally reproduce the multiview still image into a first image area of the plurality of image areas into which main-view image information from among the plurality of pieces of image information is inserted; and outputting multiview still image data including the plurality of pieces of image information based on the multiview still image file format. The method may further include inserting area offset information indicating a start position of each of the plurality of image areas into the first image area.

According to aspects of one or more exemplary embodiments, a plurality of pieces of image information about multiple view images forming a multiview still image may all be inserted into one piece of still image data, 3D attribute information to restore the plurality of pieces of image information to the multiple view images and to three-dimensionally reproduce the multiple view images may be inserted into the one piece of still image data, and may then be transmitted. Also, the plurality of pieces of image information about the multiple view images forming the multi-view still image, and the 3D attribute information may all be extracted from the one piece of still image data. By using the 3D attribute information, two or more pieces of image information that form a desired stereo pair may be selected to restore and to three-dimensionally reproduce the multiple view images.

According to aspects of one or more exemplary embodiments, 3D still image data having a still image file format may be inserted into a media data area of a media file format, 3D attribute information to restore and to three-dimensionally reproduce a 3D still image may be inserted into a moov area of the media file format, and then they may be transmitted. Also, with respect to one piece of still image data, the 3D still image data having the still image file format may be extracted from the media data area of the media file format, the 3D attribute information may be extracted from the moov area of the media file format, and thus a left-view image and a right-view image may be restored and three-dimensionally reproduced by using the 3D attribute information.

According to an aspect of an exemplary embodiment, there is provided a method of providing a multiview still image service, the method including operations of: configuring a multiview still image file format including a plurality of image areas into which a plurality of pieces of image information forming a multiview still image are inserted; inserting the plurality of pieces of image information into the plurality of image areas, respectively; inserting 3D basic attribute information to three-dimensionally reproduce the multiview still image into a first image area of the plurality of image areas into which main-view image information from among the plurality of pieces of image information is inserted; and outputting multiview still image data including the plurality of pieces of image information based on the multiview still image file format. The method may further include an operation of inserting area offset information indicating a start position of each of the plurality of image areas into the first image area.

According to an aspect of another exemplary embodiment, there is provided a method of receiving a multiview still image service, the method including operations of: receiving and parsing multiview still image data based on a multiview still image file format including a plurality of image areas; extracting 3D basic attribute information to three-dimensionally reproduce a multiview still image from a first image area of the plurality of image areas into which main-view image information from among a plurality of pieces of image information forming the multiview still image is inserted; and extracting the main-view image information from the first image area, and extracting the rest of the plurality of pieces of image information from the rest of the plurality of image areas, respectively. The method may further include an operation of restoring and three-dimensionally reproducing multiple view images that form the multiview still image, by using the extracted 3D basic attribute information and the plurality of pieces of extracted image information.

According to an aspect of another exemplary embodiment, there is provided a method of providing a multiview still image service based on a media file format, the method including operations of: inputting at least one image data having a still image file format into which a plurality of pieces of image information forming a multiview still image are inserted; inserting the at least one image data having the still image file format into a media data area of the media file format; inserting metadata containing information to three-dimensionally reproduce multiview still image data into a moov area of the media file format; and outputting the multiview still image data containing the plurality of pieces of image information based on the media file format.

According to an aspect of another exemplary embodiment, there is provided a method of receiving a multiview still image service based on a media file format, the method including operations of: receiving and parsing multiview still image data based on the media file format; extracting 3D metadata from a moov area of the media file format, wherein the 3D metadata contains information to restore multiple view images forming a multiview still image and to three-dimensionally reproduce the multiple view images; and extracting at least one image data that has a still image file format and contains image information about the multiple view images, from a media data area of the media file format. The method may further include an operation of restoring and three-dimensionally reproducing the multiple view images that form the multiview still image, by using the extracted 3D metadata and the plurality of pieces of extracted image information.

According to an aspect of another exemplary embodiment, there is provided a multiview still image service providing apparatus including: a multiview still image file format configuring unit for configuring a multiview still image file format including a plurality of image areas into which a plurality of pieces of image information forming a multiview still image are inserted; an image information inserting unit for inserting the plurality of pieces of image information into the plurality of image areas, respectively; an attribute information inserting unit for inserting 3D basic attribute information to three-dimensionally reproduce the multiview still image into a first image area of the plurality of image areas into which main-view image information from among the plurality of pieces of image information is inserted; and an output unit for outputting multiview still image data comprising the plurality of pieces of image information based on the multiview still image file format.

According to an aspect of another exemplary embodiment, there is provided a multiview still image service receiving apparatus including: a receiving and parsing unit for receiving and parsing multiview still image data based on a multiview still image file format including a plurality of image areas; an attribute information extracting unit for extracting 3D basic attribute information to three-dimensionally reproduce a multiview still image from a first image area of the plurality of image areas into which main-view image information from among a plurality of pieces of image information forming the multiview still image is inserted; an image information extracting unit for extracting the main-view image information from the first image area, and extracting the rest of the plurality of pieces of image information from the rest of the plurality of image areas, respectively; and an image restoring unit for restoring multiple view images that form the multiview still image, by using the extracted 3D basic attribute information and the plurality of pieces of extracted image information.

According to an aspect of another exemplary embodiment, there is provided a media file format-based multiview still image service providing apparatus including: an image data input unit for inputting at least one image data having a still image file format into which a plurality of pieces of image information forming a multiview still image are inserted; an image data inserting unit for inserting the at least one image data having the still image file format into a media data area of the media file format; a 3D metadata inserting unit for inserting 3D metadata containing information to three-dimensionally reproduce multiview still image data into a moov area of the media file format; and an output unit for outputting the multiview still image data containing the plurality of pieces of image information based on the media file format.

According to an aspect of another exemplary embodiment, there is provided a media file format-based multiview still image service receiving apparatus including: a receiving and parsing unit for receiving and parsing multiview still image data based on the media file format; a 3D metadata extracting unit for extracting 3D metadata from a moov area of the media file format, wherein the 3D metadata contains information to restore multiple view images forming a multiview still image and to three-dimensionally reproduce the multiple view images; an image data extracting unit for extracting at least one image data that has a still image file format and contains image information about the multiple view images, from a media data area of the media file format; and an image restoring unit for restoring the multiple view images that form the multiview still image, by using the extracted 3D metadata and the plurality of pieces of extracted image information.

According to an aspect of another exemplary embodiment, there is provided a computer-readable recording medium having recorded thereon a program for executing the method of providing a multiview still image service, by using a computer.

According to an aspect of another exemplary embodiment, there is provided a computer-readable recording medium having recorded thereon a program for executing the method of receiving a multiview still image service, by using a computer.

According to an aspect of another exemplary embodiment, there is provided a computer-readable recording medium having recorded thereon a program for executing the method of providing a multiview still image service based on a media file format.

According to an aspect of another exemplary embodiment, there is provided a computer-readable recording medium having recorded thereon a program for executing the method of receiving a multiview still image service based on a media file format.

DETAILED DESCRIPTION OF EXEMPLARY EMBODIMENTS

Hereinafter, with reference to FIGS. 1 through 20, according to one or more exemplary embodiments, there is provided a multiview still image file format to be used in efficient transmission and reception of image information about a plurality of still images that form a multiview still image, and various types of information used to three-dimensionally reproduce the multiview still image, and there is also provided a multiview still image service to provide and receive the multiview still image file format.

Figure 1:
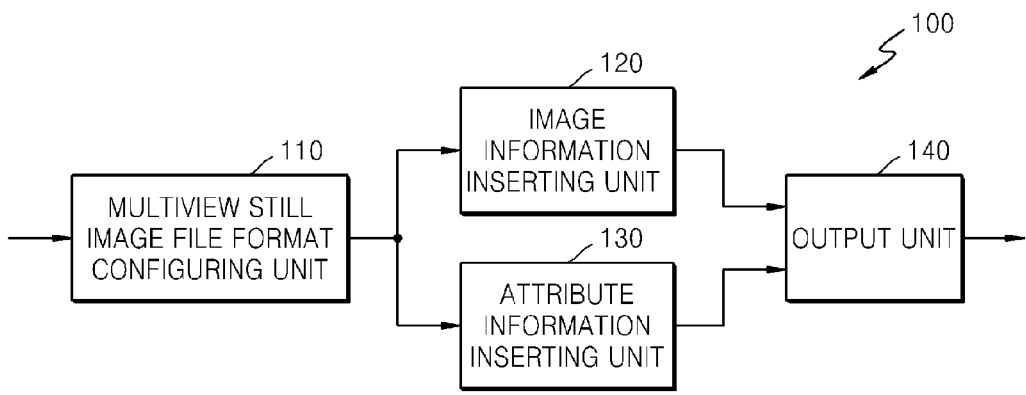
FIG. 1 is a block diagram of a multiview still image service providing apparatus according to an exemplary embodiment.

FIG. 1 is a block diagram of a multiview still image service providing apparatus 100 according to an exemplary embodiment.

The multiview still image service providing apparatus 100 includes a multiview still image file format configuring unit 110, an image information inserting unit 120, an attribute information inserting unit 130, and an output unit 140.

The multiview still image file format configuring unit 110 configures a multiview still image file format in which data about a multiview still image is recorded. The multiview still image may be formed of multiple view images. The multiple view images for forming the multiview still image may be expressed as at least one of a pixel value of each multiple view image, a depth between views, disparity between views, etc. Thus, a plurality of pieces of image information forming the multiview still image may include at least one of pixel information, depth information, disparity information, etc., in regard to the multiple view images. Also, in the plurality of pieces of image information, some of the plurality of pieces of image information may be composed.

Thus, the multiview still image file format configuring unit 110 may configure the multiview still image file format having a structure in which the plurality of pieces of image information forming the multiview still image are stored. The multiview still image file format configuring unit 110 may configure a multiview still image file format having a plurality of image areas into which the plurality of pieces of image information forming the multiview still image are inserted.

The image areas of the multiview still image file format configured by the multiview still image file format configuring unit 110 may include an image information area into which image information is inserted, and an additional information area into which additional information regarding the image information is inserted. Also, the image areas of the multiview still image file format configured by the multiview still image file format configuring unit 110 may include an image start area that indicates a start of a current image area, and an image end area that indicates an end of the current image area. The image information area and the additional information area may be positioned between the image start area and the image end area.

The image information inserting unit 120 may insert the plurality of pieces of image information forming the multiview still image into the image areas of the multiview still image file format configured by the multiview still image file format configuring unit 110, respectively. The image information inserting unit 120 may insert main-view image information from among the plurality of pieces of image information forming the multiview still image into a first image area (i.e., one of the image areas) from among the image areas of the multiview still image file format.

The attribute information inserting unit 130 may insert a plurality of pieces of various attribute information about the plurality of pieces of image information, which are inserted into the image areas of the multiview still image file format configured by the multiview still image file format configuring unit 110, into the image areas.

The attribute information inserting unit 130 inserts three-dimensional (3D) basic attribute information, which is used to three-dimensionally reproduce the multiview still image, into the first image area from among the image areas of the multiview still image file format configured by the multiview still image file format configuring unit 110. The 3D basic attribute information indicates attributes used to restore the plurality of pieces of image information forming the multiview still image to multiple view images and then to three-dimensionally reproduce the multiple view images The first image area from among the image areas of the multiview still image file format configured by the multiview still image file format configuring unit 110 may include a first additional information area into which Exchangeable Image File Format (EXIF) information about image information is inserted. The first image area from among the image areas of the multiview still image file format configured by the multiview still image file format configuring unit 110 may further include supplementary additional information areas in addition to the first additional information area.

The attribute information inserting unit 130 may insert the 3D basic attribute information into the supplementary additional information areas in addition to the first additional information area of the first image area.

In another exemplary embodiment, the attribute information inserting unit 130 may insert the 3D basic attribute information into the first additional information area of the first image area. Also, in another exemplary embodiment, the attribute information inserting unit 130 may insert the 3D basic attribute information into every first additional information area of the image areas. In this case, if required, the attribute information inserting unit 130 may also insert the 3D basic attribute information into the supplementary additional information areas in addition to the first additional information area of the first image area.

The attribute information inserting unit 130 according to the present exemplary embodiment may insert area offset information, which indicates a start position of each of the image areas, into the first image area of the multiview still image file format. The attribute information inserting unit 130 may insert the area offset information into an additional information area of the first image area into which the 3D basic attribute information is inserted.

The attribute information inserting unit 130 may insert 3D additional attribute information about each of the plurality of pieces of image information into each of the image areas. The 3D additional attribute information indicates individual attributes used (e.g., required) to restore current image information to multiple view images and then to three-dimensionally reproduce the multiple view images.

Thus, by the image information inserting unit 120, the 'current image information' from among the plurality of pieces of image information may be inserted into an image information area of a 'current image area' in each of the image areas, and, by the attribute information inserting unit 130, additional information such as EXIF information about the current image information, and 3D attribute information for 3D reproduction may be inserted into an additional information area of the current image area.

With respect to each of the image areas, the attribute information inserting unit 130 may insert 3D additional attribute information, which is about the current image information inserted into the current image area, into a supplementary additional information area in addition to an additional information area into which 3D basic attribute information is inserted.

The 3D basic attribute information may include at least one of information about the manner of two-dimensional (2D) and 3D output of the multiview still image, information about a 3D image format of the multiview still image, information about a priority view of the multiview still image, information about an arrangement order of views of the multiview still image, information about an index of a main-view from among the views of the multiview still image, information about the number of the views of the multiview still image, information about a distance between a start point of a still image file format of the multiview still image and each of the image areas, and information about 3D image format configuring elements of each of a plurality of pieces of image information.

The 3D basic attribute information about the plurality of pieces of image information which are inserted into the multiview still image file format may include information about a horizontal value and a vertical value of an aspect ratio of an original image of a predetermined view image from among the multiple view images forming the multiview still image.

When one or more stereo pairs formed by the plurality of pieces of image information include a stereo pair having depth information between different views, the 3D basic attribute information includes multipath information that indicates a stereo pair having depth information between views that correspond to sizes of reproducing apparatuses.

3D additional attribute information about current image information inserted into a current image area of the multiview still image file format may include information about a size of an occlusion area that occurs at a boundary of a current view image of the current image information in comparison to a reference view image, and information about a direction of the boundary at which the occlusion area occurs.

The 3D additional attribute information about the current image information may include information about the number of pieces of image information which form a stereo pair with the current view image of the current image information from among the plurality of pieces of image information.

In addition, the 3D additional attribute information about the current image information may include at least one of information about an index of at least one piece of information which forms a stereo pair with the current view image of the current image information from among the plurality of pieces of image information, information about a width and a height of a reproduction image of the current view image which is used to adjust a binocular parallax between the current view image and a paired view image of the stereo pair, information about horizontal and vertical coordinates of the reproduction image of the current view image, and information about horizontal and vertical coordinates of a reproduction image of the paired view image. The 3D additional attribute information may further include information about a width and a height of the reproduction image of the paired view image.

The 3D additional attribute information about the current image information may include at least one of information about a 3D image format configuring element of the current image information from among the plurality of pieces of image information, information about a camera that obtained the multiview still image, information about an efficient minimum vertical disparity of the current image information, information about an efficient maximum vertical disparity of the current image information, low fatigue information to reduce viewer fatigue that may occur due to 3D reproduction of the current image information, and information about chrominance of the current image information, compared to the main-view.

Based on the multiview still image file format configured by the multiview still image file format configuring unit 110, the output unit 140 of the multiview still image service providing apparatus 100 outputs multiview still image data including the plurality of pieces of image information and the various attribute information which are used by the image information inserting unit 120 and the attribute information inserting unit 130 to form the multiview still image.

Figure 2:
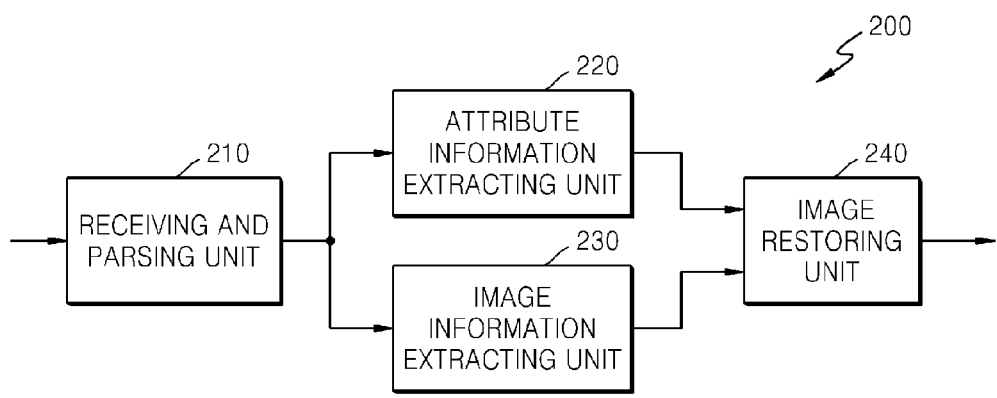
FIG. 2 is a block diagram of a multiview still image service receiving apparatus, according to an exemplary embodiment.

FIG. 2 is a block diagram of a multiview still image service receiving apparatus 200, according to an exemplary embodiment.

The multiview still image service receiving apparatus 200 includes a receiving and parsing unit 210, an attribute information extracting unit 220, an image information extracting unit 230, and an image restoring unit 240.

The receiving and parsing unit 210 receives and parses multiview still image data which includes a plurality of image areas and is based on a multiview still image file format. The multiview still image data parsed by the receiving and parsing unit 210 may be segmented into the plurality of image areas.

The attribute information extracting unit 220 may extract 3D basic attribute information, which is used to three-dimensionally reproduce a multiview still image, from a first image area among the image areas of the multiview still image data.

The image information extracting unit 230 may extract a plurality of pieces of image information which form the multiview still image from the image areas.

The image information extracting unit 230 may extract, from the image areas, the plurality of pieces of image information including at least one of image pixel value information about multiple view still images that form the multiview still image, depth information between views, disparity information between the views, and information obtained by composing some of the plurality of pieces of image information.

The image information extracting unit 230 may extract main-view image information from among the plurality of pieces of image information forming the multiview still image from a first image area, and may extract the rest of the plurality of pieces of image information other than the main-view image information from the rest of the image areas other than the first image area.

The attribute information extracting unit 220 may extract area offset information, which indicates a start position of each of the image areas, from the first image area of the multiview still image data. According to the area offset information, a position of each of the image areas in the multiview still image data may be determined. Thus, the attribute information extracting unit 220 and the image information extracting unit 230 may search for the rest of the image areas other than the first image area, according to the area offset information, and thus may respectively extract the rest of the plurality of pieces of image information other than the main-view image information, and the various attribute information.

The attribute information extracting unit 220 may extract the 3D basic attribute information from a supplementary additional information area of the first image area, in addition to a first additional information area into which EXIF information is inserted.

In another exemplary embodiment, the attribute information extracting unit 220 may extract the 3D basic attribute information from the first additional information area of the first image area into which EXIF information is inserted. In another exemplary embodiment, the attribute information extracting unit 220 may extract the 3D basic attribute information from the first additional information area of each of the image areas. In this case, the 3D basic attribute information may be further extracted from the supplementary additional information area of the first image area, in addition to the first additional information area.

The attribute information extracting unit 220 may extract the area offset information from an additional information area of the first image area into which the 3D basic attribute information is inserted.

The attribute information extracting unit 220 may extract 3D additional attribute information, which indicates individual attributes used to three-dimensionally reproduce current image information that is inserted into a current image area and that is among the plurality of pieces of image information, from each of the image areas.

With respect to each of the image areas, the attribute information extracting unit 220 may extract the 3D additional attribute information about the current image information from a supplementary additional information area in addition to the additional information area into which the 3D basic attribute information is inserted.

The attribute information extracting unit 220 and the image information extracting unit 230 may extract image information and attribute information corresponding to the image information from among the plurality of pieces of image information from an area between an image start area and an image end area of the current image area.

Types of the 3D basic attribute information and the 3D additional attribute information which are extracted by the attribute information extracting unit 220 may be the same as those described above with reference to the multiview still image service providing apparatus 100.

Thus, with respect to each of the image areas, the image information extracting unit 230 may extract the current image information from among the plurality of pieces of image information from an image information area of the current image area of the multiview still image data, and with respect to each of the image areas, the attribute information extracting unit 220 may extract additional information and 3D attribute information about the current image information from an additional information area of the current image area.

The image restoring unit 240 may restore multiple view still images that form the multiview still image, by using the 3D basic attribute information and the 3D additional attribute information which are extracted by the attribute information extracting unit 220, and by using the plurality of pieces of image information extracted by the image information extracting unit 230.

The multiview still image service receiving apparatus 200 may restore and three-dimensionally reproduce the multiple view still images that form the multiview still image, based on the 3D basic attribute information and the 3D additional attribute information.

The multiview still image service receiving apparatus 200 may read an aspect ratio of an original image of a current view image, based on information about a horizontal value and a vertical value of an aspect ratio of an original image of a predetermined view image which is from the 3D basic attribute information, may perform a post-process to adjust an image size of the restored multiple view images, based on the aspect ratio of the original image and a size of a current 3D display device, and then may three-dimensionally reproduce the multiple view images.

The multiview still image service receiving apparatus 200 may select a combination of image information, which forms a stereo pair corresponding to a size of a reproducing apparatus, from the plurality of pieces of image information, based on multipath information of the 3D basic attribute information, may restore the multiple view images by using the combination of image information which forms the stereo pair, and thus may three-dimensionally reproduce the multiple view images.

The multiview still image service receiving apparatus 200 may perform a post-process on an occlusion area that occurs at an image boundary of the multiple view images, based on information about a size of the occlusion area and information about a direction of the occlusion area, which are from among the 3D additional attribute information, and may three-dimensionally reproduce the multiple view images.

The multiview still image service receiving apparatus 200 may restore the multiple view images that form the stereo pair, based on information about the number of pieces of image information which form the stereo pair with the current view image of the current image information from among the plurality of pieces of image information, which are from among the 3D additional attribute information, and may three-dimensionally reproduce the multiple view images.

The multiview still image service receiving apparatus 200 may restore the current view image and a paired view image which form a stereo pair, based on at least one of information about an index of at least one piece of information which forms a stereo pair with the current view image of the current image information from among the plurality of pieces of image information, information about a width and a height of a reproduction image of the current view image which is used to adjust a binocular parallax between the current view image and the paired view image, information about horizontal and vertical coordinates of a reproduction image of the current view image, and information about horizontal and vertical coordinates of a reproduction image of the paired view image, which are from among the 3D additional attribute information, and thus may three-dimensionally reproduce the reproduction images of the current view image and the paired view image.

The multiview still image service receiving apparatus 200 may three-dimensionally reproduce the reproduction image of the paired view image by further using information about a width and a height of the reproduction image of the paired view image that forms the stereo pair with the current image information, which is from among the 3D additional attribute information.

The multiview still image service providing apparatus 100 may insert the plurality of pieces of image information about the multiple view images, which form the multiview still image, into one piece of still image data, may insert 3D attribute information, which is used to restore the plurality of pieces of image information to the multiple view images and to three-dimensionally reproduce them, into the still image data, and may output the still image data.

The multiview still image service receiving apparatus 200 may extract the plurality of pieces of image information about the multiple view images, which form the multiview still image, and may extract the 3D attribute information from the still image data. Also, the multiview still image service receiving apparatus 200 may select two or more pieces of image information which form a desired stereo pair and then restore the multiple view images by using the extracted 3D attribute information, and may three-dimensionally reproduce the multiple view images.

Figure 3:
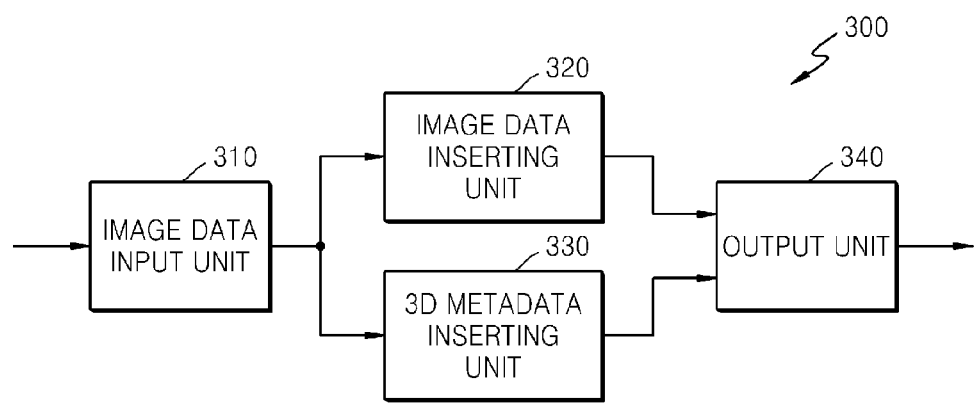
FIG. 3 is a block diagram of a media file format-based multiview still image service providing apparatus according to an exemplary embodiment.

FIG. 3 is a block diagram of a media file format-based multiview still image service providing apparatus 300, according to an exemplary embodiment.

The media file format-based multiview still image service providing apparatus 300 includes an image data input unit 310, an image data inserting unit 320, a 3D metadata inserting unit 330, and an output unit 340.

Via the image data input unit 310, at least one piece of image data having a still image file format into which a plurality of pieces of image information forming a multiview still image are inserted is input to the media file format-based multiview still image service providing apparatus 300. The still image file format may include a Joint Photographic Coding Experts Group (JPEG) file format.

The plurality of pieces of image information may include at least one of image pixel value information about multiple view still images that form the multiview still image, depth information between views, disparity information between the views, and information obtained by composing some of the plurality of pieces of image information.

A media file format may include an International Organization for Standardization (ISO) media file format. The media file format may include a media data area into which image information is inserted, and a moov area into which various types of additional information about the image information are inserted. The moov area may include a track area, the track area may include a media information area, and the media information area may include a sample table area, so that the moov area, the track area, the media information area, and the sample table area may be hierarchically formed.

The image data inserting unit 320 inserts the at least one image data having the still image file format into the media data area of the media file format.

The image data inserting unit 320 may insert image data, which has a still image file format that is one of a side-by-side format and a top and bottom format and includes a 3D image, into the media data area of the media file format.

The image data inserting unit 320 may insert two or more pieces of image data, which have a still image file format that is one of a frame sequential format and a field sequential format and include 3D image data, into the media data area of the media file format. Multiple view image data having a still image file format that includes multiple view frames or multiple view fields of the frame sequential format and the field sequential format may be inserted into the media data area of the media file format.

The 3D metadata inserting unit 330 may insert 3D metadata, which has information to three-dimensionally reproduce multiview still image data, into the moov area of the media file format. The 3D metadata about the multiview still image data may include information about a 3D image format of the image data inserted into the media data area, and information about an arrangement order of views of the multiview still image.

The 3D metadata inserting unit 330 may insert image data offset information, which indicates a start position of the image data having the still image file format which is inserted into the media data area, into the moov area of the media file format.

The 3D metadata inserting unit 330 may insert information about a camera that obtained the multiview still image and low fatigue information to reduce viewer fatigue that may occur due to 3D reproduction of a current still image into the moov area of the media file format.

The 3D metadata inserting unit 330 may insert the 3D metadata about the multiview still image data into the track area that is a lower area of the moov area of the media file format, the media information area that is a lower area of the track area, the sample table area that is a lower area of the media information area, and a lower area of the sample table area. Here, the lower area of the sample table area may be a stereoscopic video media information area.

The 3D metadata inserting unit 330 may insert the camera information and the low fatigue information into the track area, the media information area, the sample table area, and a stereoscopic camera and display information area that is a lower area of the sample table area.

The 3D metadata inserting unit 330 may further insert the 3D basic attribute information and the 3D additional attribute information, as the 3D metadata, into the media information area that is a lower area of the track area of the media file format.

The output unit 340 outputs the multiview still image data containing the plurality of pieces of image information, according to the media file format.

Figure 4:
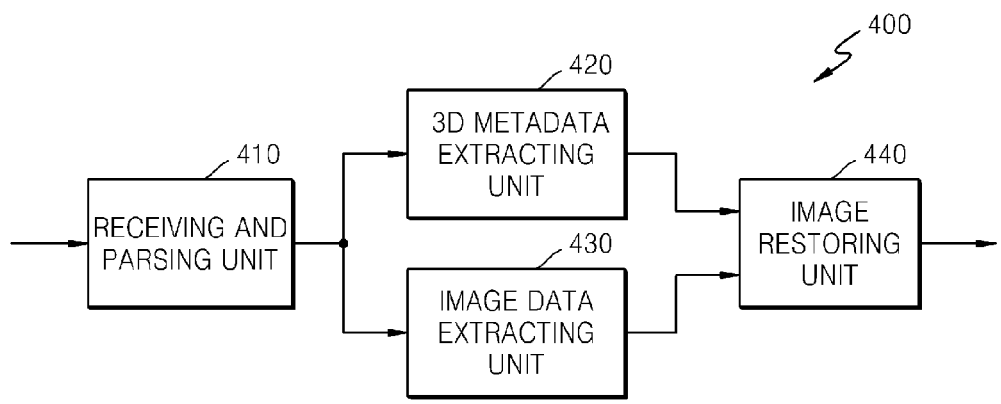
FIG. 4 is a block diagram of a media file format-based multiview still image service receiving apparatus, according to an exemplary embodiment.

FIG. 4 is a block diagram of a media file format-based multiview still image service receiving apparatus 400, according to an exemplary embodiment.

The media file format-based multiview still image service receiving apparatus 400 includes a receiving and parsing unit 410, a 3D metadata extracting unit 420, an image data extracting unit 430, and an image restoring unit 440.

The receiving and parsing unit 410 receives and parses multiview still image data having a media file format. The receiving and parsing unit 410 may parse the multiview still image data having the media file format and thus may search for a media data area and a moov area of the media file format. Also, the receiving and parsing unit 410 may hierarchically search for a track area that is a lower area of the moov area, a media information area that is a lower area of the track area, and a sample table area that is a lower area of the media information area The 3D metadata extracting unit 420 may extract 3D metadata about a multiview still image from the moov area of the multiview still image data parsed by the receiving and parsing unit 410. The 3D metadata may include information to restore multiple view images forming a multiview still image and then to three-dimensionally reproduce the multiple view images.

The image data extracting unit 430 may extract at least one image data having a still image file format from the media data area of the multiview still image data parsed by the receiving and parsing unit 410. The image data having the still image file format may include image information about the multiple view images forming the multiview still image.

The image restoring unit 440 may restore the multiple view images forming the multiview still image, by using the 3D metadata extracted by the 3D metadata extracting unit 420, and the plurality of pieces of image information extracted by the image data extracting unit 430.

The types of the 3D metadata extracted by the 3D metadata extracting unit 420 may be the same as those described with reference to the media file format-based multiview still image service providing apparatus 300.

The media file format-based multiview still image service providing apparatus 300 may insert 3D still image data having the still image file format into the media data area of the media file format, may insert the 3D attribute information, which is used to restore and three- dimensionally reproduce a 3D still image, into the moov area of the media file format, and may output the media file format-based 3D still image data.

With respect to a piece of still image data, the media file format-based multiview still image service receiving apparatus 400 may extract the 3D still image data having the still image file format from the media data area of the media file format, and may extract the 3D attribute information from the moov area of the media file format. Also, the media file format-based multiview still image service receiving apparatus 400 may restore and three-dimensionally reproduce a left-view image and a right-view image by using the extracted 3D attribute information.

Figure 5:
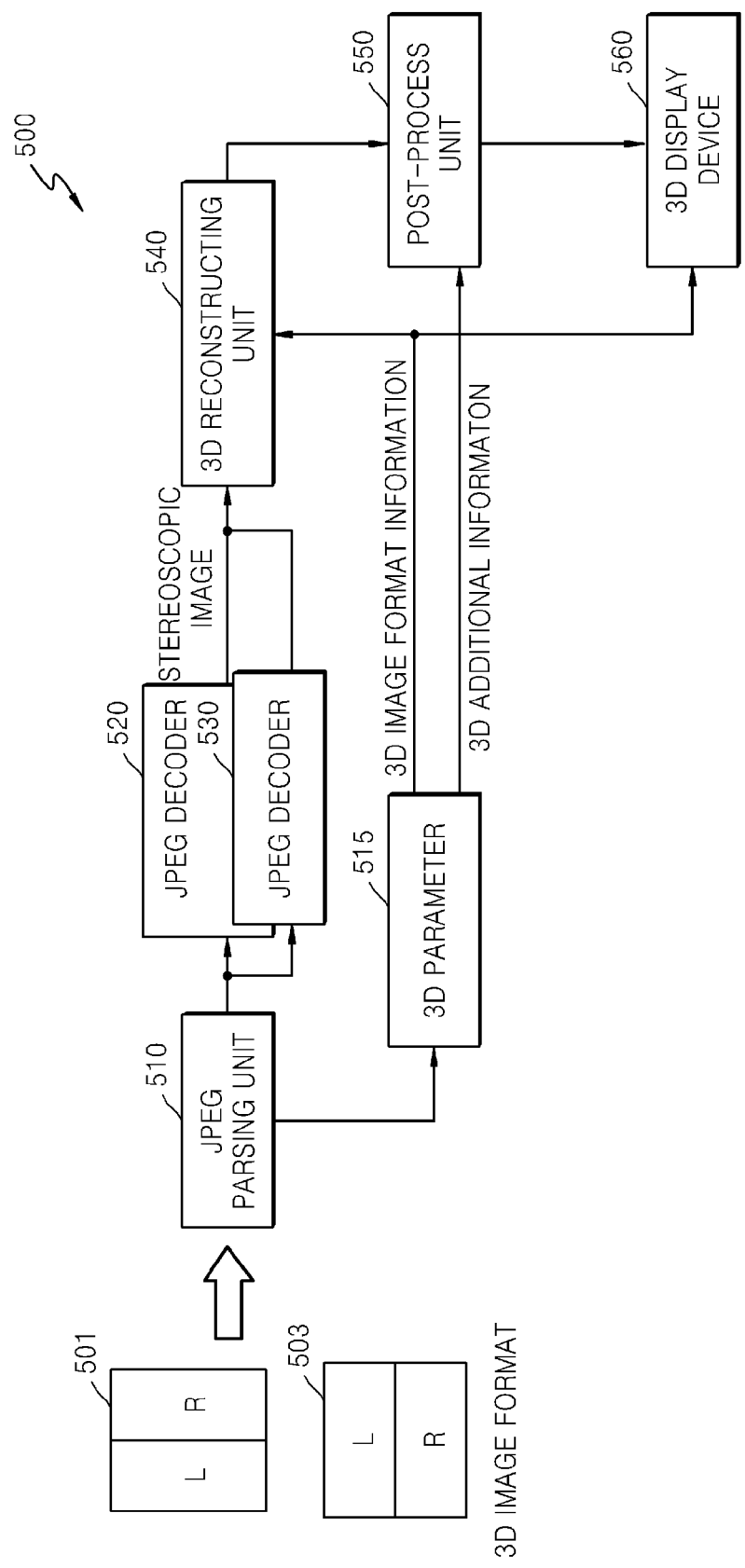
FIG. 5 illustrates operations of a three-dimensional (3D) image reproducing system, according to an exemplary embodiment.

FIG. 5 illustrates operations of a 3D image reproducing system 500, according to an exemplary embodiment.

The 3D image reproducing system 500 receives 3D still image data containing a 3D still image and having a still image format. The 3D still image may be obtained from a 3D camera or a 3D image capturing device embedded in a 3D mobile phone. For example, the 3D still image data containing a side-by-side format-based stereoscopic image 501 or a top and bottom format-based stereoscopic image 503 may be input. The 3D still image data may be image data having a JPEG file format.

Stereoscopic image information and a 3D parameter 515 may be extracted from the image data having the JPEG file format by using a JPEG parsing unit 510. The stereoscopic image information may be decoded according to each of multiple views, by using a JPEG decoder 520 and 530, so that multiple view images of the stereoscopic image may be restored.

A 3D reconstructing unit 540 may reconstruct the multiple view images to form a combination for 3D reproduction, by using 3D image format information of the 3D parameter 515, and a 3D display device 560 may three-dimensionally reproduce the multiple view images. The 3D image format information may indicate a 3D image format of the restored stereoscopic image.

A post-process unit 550 may perform various post-processes on the multiple view images so as to allow the multiple view images to be correctly reproduced in a 3D manner, by using 3D additional information of the 3D parameter 515. The multiple view images that are post-processed based on the 3D additional information may be correctly reproduced in a 3D manner via the 3D display device 560.

Figure 6:
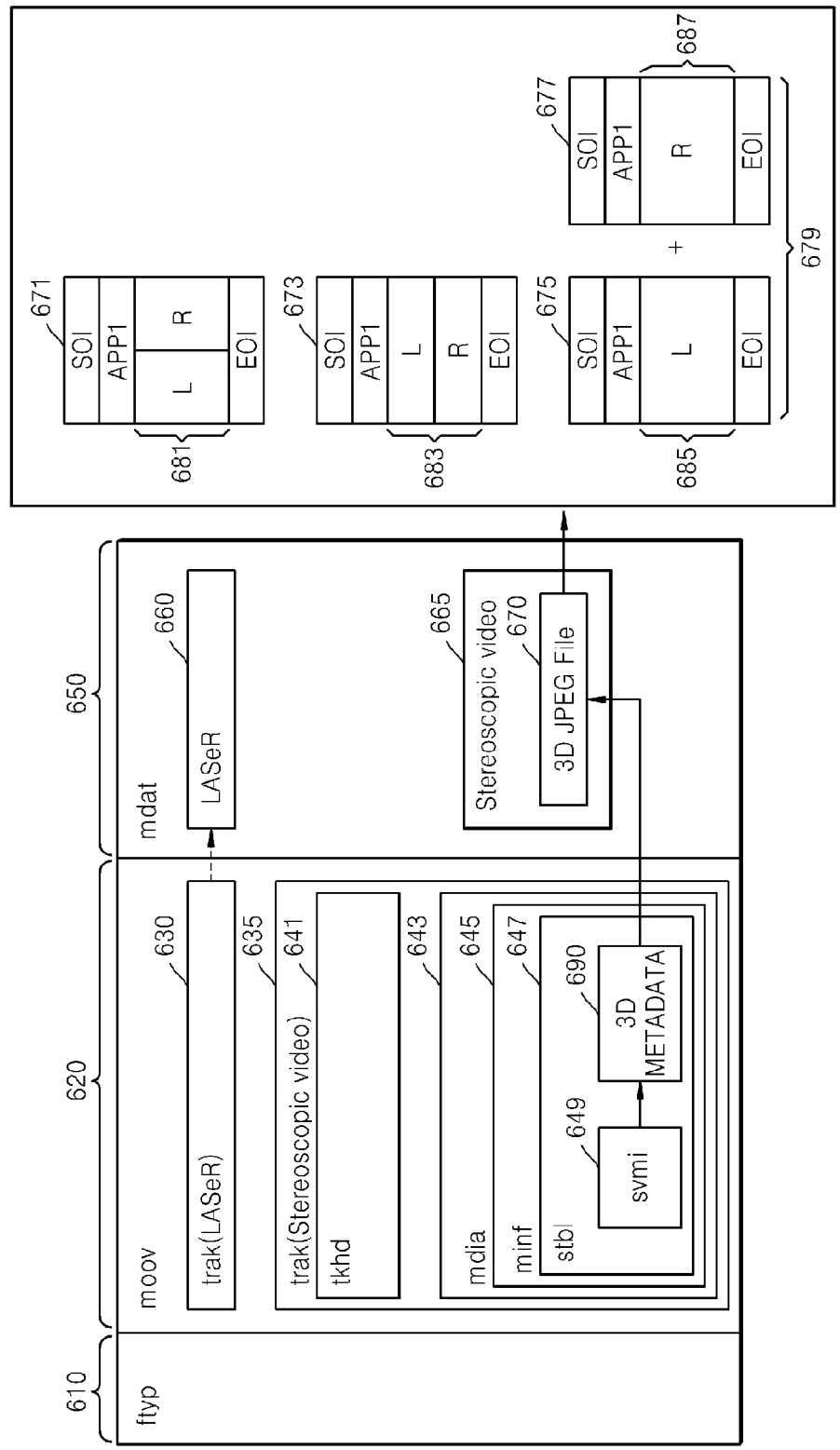
FIG. 6 illustrates an example of a multiview still image file format generated by the media file format-based multiview still image service providing apparatus according to an exemplary embodiment.

FIG. 6 illustrates an example of a multiview still image file format 600 generated by the media file format-based multiview still image service providing apparatus 300.

The media file format-based multiview still image service providing apparatus 300 may generate the multiview still image file format 600 based on an ISO media file format. The multiview still image file format 600 may include a file type area ftyp 610 based on the ISO media file format, a movie area moov 620, and a media data area mdat 650. The file type area ftyp 610 may include information about a file type of the multiview still image file format 600. The media data area mdat 650 may include media data. The movie area moov 620 may include information about media and the media data included in the media data area mdat 650.

The movie area moov 620 may include a first track area trak 630 that contains information for a media data area mdia 660 having a Light Application Scene Representation (LASeR) format, and a second track area trak 635 that contains information for a stereoscopic video data area 665.

The second track area trak 635 may include a track header area tkhd 641 containing general information about the second track area trak 635, and a media information storage area mdat 643. The media information storage area mdat 643 may include a media information area minf 645. The media information area minf 645 may include a sample table area stbl 647. The sample table area stbl 647 may include a stereoscopic video media information area svmi 649.

The media file format-based multiview still image service providing apparatus 300 may insert the multiview still image data having the still image file format into the stereoscopic video data area 665 of the media data area mdat 650 of the multiview still image file format 600. For example, the media file format-based multiview still image service providing apparatus 300 may insert JPEG file format-based multiview still image data 670 into the stereoscopic video data area 665.

A 3D image having a 3D image format may be inserted into an image data area of the JPEG file format-based multiview still image data 670. For example, a side-by-side format-based 3D image may be inserted into an image data area 681 of JPEG file format-based multiview still image data 671, a top and bottom format-based 3D image 683 may be inserted into an image data area 683 of JPEG file format-based multiview still image data 673, and a set 679 of two pieces of multiview still image data 675 and 677 which respectively contain multiple view images 685 and 687 having a frame sequential format may be inserted into image data areas 685 and 687 of two pieces of JPEG file format-based multiview still image data 675 and 677.

The media file format-based multiview still image service providing apparatus 300 may insert 3D metadata 690 about the multiview still image data 670 into the movie area moov 620 of the multiview still image file format 600. For example, the media file format-based multiview still image service providing apparatus 300 may insert, as the 3D metadata 690, 3D image format information and view arrangement information with respect to the multiview still image data 670 into the stereoscopic video media information area svmi 649 that is a lower area of the movie area moov 620 of the multiview still image file format 600.

When the multiview still image data 671 is inserted into the stereoscopic video data area 665, 3D image format information indicating a side-by-side format may be inserted into the stereoscopic video media information area svmi 649. Similarly, when the multiview still image data 673 is inserted into the stereoscopic video data area 665, 3D image format information indicating a top and bottom format may be inserted into the stereoscopic video media information area svmi 649. When the two pieces of multiview still image data 675 and 677 are inserted into the stereoscopic video data area 665, 3D image format information indicating a field sequential format or a frame sequential format may be inserted into the stereoscopic video media information area svmi 649.

View arrangement information that is set according to an arrangement order of left-view image information and right-view image information of the plurality of pieces of multi-view still image data 671, 673, 675, and 677 which are inserted into the stereoscopic video data area 665 may also be inserted into the stereoscopic video media information area svmi 649.

Camera information and low fatigue information about the multiview still image data 670 may be inserted into a stereoscopic camera disparity information area that is a lower area of the movie area moov 620 of the multiview still image file format 600.

The media file format-based multiview still image service receiving apparatus 400 may parse the multiview still image file format 600 based on an ISO media file format, and thus may extract the 3D metadata 690 from the movie area moov 620 and may extract the multiview still image data 670 from the media data area mdat 650. The media file format-based multiview still image service receiving apparatus 400 may restore the multiple view images from the multiview still image data 670 by using the 3D metadata 690 and thus may output the multiple view images.

Figure 7:
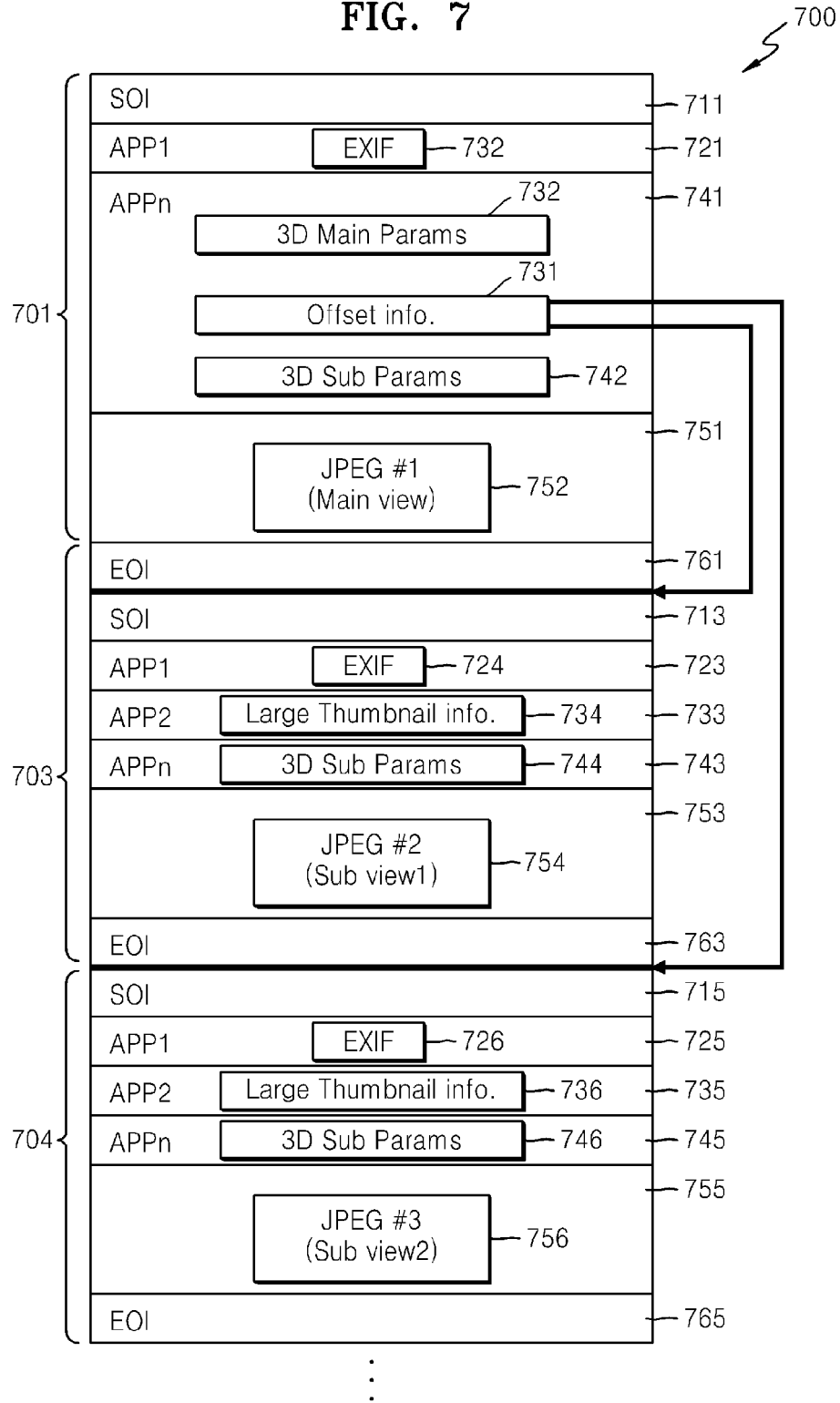
FIGS. 7 and 8 illustrate examples of multiview still image file formats generated by the multiview still image service providing apparatus according to an exemplary embodiment.
Figure 8:
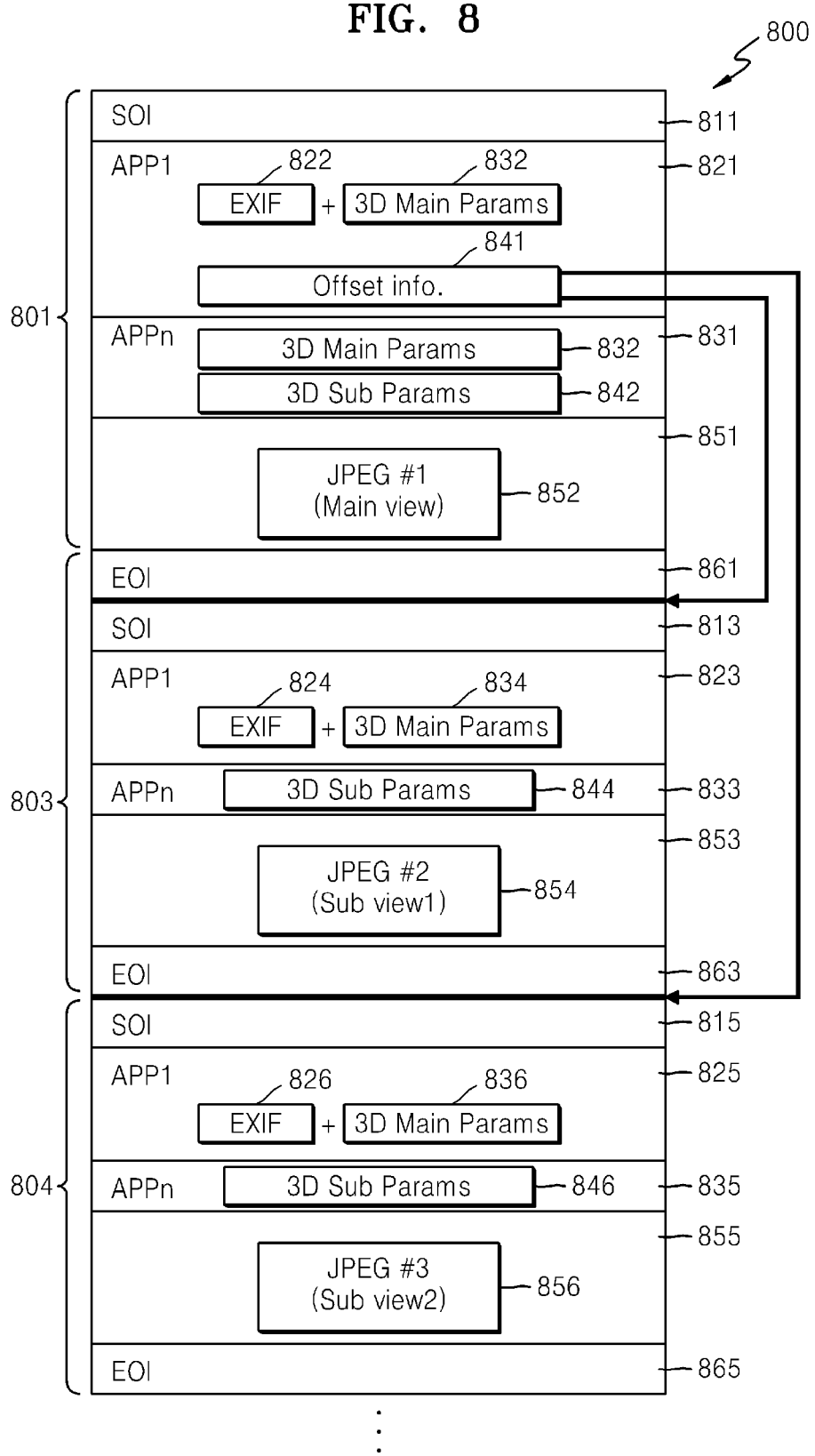

FIGS. 7 and 8 illustrate examples of multiview still image file formats 700 and 800 generated by the multiview still image service providing apparatus 100 according to an exemplary embodiment.

First, the example of the multiview still image file format 700 generated by the multiview still image service providing apparatus 100 is shown in FIG. 7. The multiview still image file format 700 may include a plurality of image areas 701, 703, and 705 into which a plurality of pieces of image information forming a multiview still image are inserted, respectively. For convenience of description, it is assumed that the plurality of pieces of image information forming the multiview still image are multiple view images 752, 754, and 756 that are pixel value data.

The image areas 701, 703, and 705 may respectively include Start of Image (SOI) markers 711, 713, and 715 indicating a start of a current image area, and End of Image (EOI) markers 761, 763, and 765 indicating an end of the current image area. Also, the image areas 701, 703, and 705 may respectively include first additional information areas APP1 721, 723, and 725 into which three pieces of EXIF information 722, 724, and 726 are respectively inserted, and may respectively include image data areas 751, 753, and 755 into which image information is inserted. The image areas 703 and 705 except for the first image area 701 may respectively further include second additional information areas APP2 733 and 735 into which large thumbnail information 734 is inserted.

The image information inserting unit 120 may insert the multiple view images 752, 754, and 756 forming the multiview still image into the image data areas 751, 753, and 755 of the image areas 701, 703, and 705, respectively. As a representative example, a main-view image 752 from among the multiple view images 752, 754, and 756 may be inserted into the image data area 751 of the first image area 701.

The multiview still image file format 700 configured by the multiview still image file format configuring unit 110 may include supplementary additional information areas APPn 741, 743, and 745 in addition to the first additional information areas APP1 721, 723, and 725 or the second additional information areas APP2 733 and 735 of the image areas 701, 703, and 705, respectively.

The attribute information inserting unit 130 may insert 3D basic attribute information 732 about the multiview still image into the supplementary additional information area APPn 741 of the first image area 701. Also, the attribute information inserting unit 130 may insert area offset information 731 into the supplementary additional information area APPn 741 of the first image area 701. The area offset information 731 may indicate start positions of the image areas 701, 703, and 705.

The attribute information inserting unit 130 may insert 3D additional attribute information about the multiple view images 752, 754, and 756 into the supplementary additional information areas APPn 741, 743, and 745 of the image areas 701, 703, and 705, respectively.

The multiview still image service receiving apparatus 200 may parse the multiview still image file format 700 and thus may extract the area offset information 731 from the supplementary additional information area APPn 741 of the first image area 701 and may search for the start positions of the image areas 701, 703, and 705. The multiview still image service receiving apparatus 200 may extract the 3D basic attribute information 732 about the multiview still image from the supplementary additional information area APPn 741 of the first image area 701.

The multiview still image service receiving apparatus 200 may extract the multiple view images 752, 754, and 756 forming the multiview still image from the image areas 701, 703, and 705, respectively.

Also, the multiview still image service receiving apparatus 200 may extract the 3D additional attribute information about the multiple view images 752, 754, and 756 from the supplementary additional information areas APPn 741, 743, and 745 of the image areas 701, 703, and 705, respectively.

The multiview still image service receiving apparatus 200 may restore each of the multiple view images 752, 754, and 756 forming the multiview still image, by using the 3D basic attribute information extracted from the supplementary additional information area APPn 741 of the first image area 701 and by using the 3D additional attribute information extracted from the supplementary additional information areas APPn 741, 743, and 745, and may three-dimensionally reproduce the multiple view images 752, 754, and 756.

Next, the example of the multiview still image file format 800 generated by the multiview still image service providing apparatus 100 is shown in FIG. 8. The multiview still image file format configuring unit 110 may configure the multiview still image file format 800 to include a plurality of image areas 801, 803, and 805 into which a plurality of pieces of image information forming a multiview still image are inserted, respectively. For convenience of description, it is assumed that the plurality of pieces of image information forming the multiview still image are multiple view images 852, 854, and 856 that are a plurality of pieces of still image data having a JPEG file format and are pixel value data. The image information inserting unit 120 may insert the multiple view images 852, 854, and 856 forming the multiview still image into image data areas 851, 853, and 855 of the image areas 801, 803, and 805, respectively.

The image areas 801, 803, and 805 may respectively include SOI markers 811, 813, and 815, EOI markers 861, 863, and 865, may respectively include first additional information areas APP1 821, 823, and 825 into which three pieces of EXIF information 822, 824, and 826 are respectively inserted, and may respectively include image data areas 851, 853, and 855 into which image information is inserted.

The attribute information inserting unit 130 may insert the three pieces of EXIF information 822, 824, and 826 and three pieces of 3D basic attribute information 832, 834, and 836 about the multiview still image into the first additional information areas APP1 821, 823, and 825 of the image areas 801, 803, and 805, respectively. Also, the attribute information inserting unit 130 may insert area offset information 841 into the first additional information area APPn 821 of the first image area 801. The area offset information 841 may also indicate start positions of the image areas 803, and 805.

The multiview still image file format 800 configured by the multiview still image file format configuring unit 110 may include supplementary additional information areas APPn 831, 833, and 835 in addition to the first additional information areas APP1 821, 823, and 825 of the image areas 801, 803, and 805, respectively.

The attribute information inserting unit 130 may insert 3D additional attribute information about the multiple view images 852, 854, and 856 of the image areas 801, 803, and 805, respectively, into the supplementary additional information areas APPn 831, 833, and 835, respectively. The attribute information inserting unit 130 may further insert 3D basic attribute information into the supplementary additional information area APPn 831 of the first image area 801.

The multiview still image service receiving apparatus 200 may parse the multiview still image file format 800 and thus may extract the area offset information 841 from the first additional information areas APP1 821 of the first image area 801 and may search for the start positions of the image areas 803 and 805. The multiview still image service receiving apparatus 200 may extract 3D basic attribute information 832 about the multiview still image from the first additional information areas APP1 821 of the first image area 801.

The multiview still image service receiving apparatus 200 may extract the multiple view images 852, 854, and 856 forming the multiview still image from the image areas 801, 803, and 805, respectively. Also, the multiview still image service receiving apparatus 200 may extract the 3D additional attribute information about the multiple view images 852, 854, and 856 from the supplementary additional information areas APPn 831, 833, and 835 of the image areas 801, 803, and 805, respectively. The multiview still image service receiving apparatus 200 may further extract the 3D basic attribute information from the supplementary additional information area APPn 831 of the first image area 801.

The multiview still image service receiving apparatus 200 may restore each of the multiple view images 852, 854, and 856 forming the multiview still image, by using the three pieces of 3D basic attribute information 832, 834, and 836 extracted from the first additional information areas APP1 821, 823, and 825 of the image areas 801, 803, and 805 and by using the 3D additional attribute information extracted from the supplementary additional information areas APPn 831, 833, and 835 of the image areas 801, 803, and 805, and may three-dimensionally reproduce the multiple view images 852, 854, and 856.

Hereinafter, with reference to Tables 1 through 6, and FIGS. 9 through 16, examples of 3D basic attribute information and 3D additional attribute information according to one or more exemplary embodiments will be described.

The multiview still image service providing apparatus 100 and the media file format-based multiview still image service providing apparatus 300 may insert a plurality of pieces of image information about multiple view images forming a multiview still image, and the 3D basic attribute information into a header of multiview still image data.

The multiview still image service receiving apparatus 200 and the media file format-based multiview still image service receiving apparatus 400 may extract the plurality of pieces of image information about the multiple view images forming the multiview still image, and the 3D basic attribute information from the header of the multiview still image data, and thus may three-dimensionally reproduce the multiple view images.

Table 1 shows an example of the 3D basic attribute information.

TABLE 1

| 3D basic attribute information | Details |
|---|---|
| Enable3D | 2D/3D display of multiview still image |
| FormatStyle | 3D image format of multiview still image |
| IsLeftFirst | priority view of multiview still image |
| OriginalAspectratioX | horizontal value of aspect ratio of original image of predetermined view image from among multiple view images forming multiview still image |

TABLE 1-continued

| 3D basic attribute information | | Details |
|---|---|---|
| OriginalAspectratioY | | vertical value of aspect ratio of original image of predetermined view image from among multiple view images forming multiview still image |
| ViewOrderinginfo | | arrangement order of views of multiview still image |
| MainViewindex | | index of main-view among views of multiview still image |
| NumOfView | | the number of views of multiview still image |
| View Info. | ViewOffset[i] | distance between predetermined position of still image file format of multiview still image and each image area |
| | ViewFormat[i] | 3D image format configuring elements of each of a plurality of pieces of image information |
| | Multipathinfo[i] | When one or more stereo pairs formed by a plurality of pieces of image information include a stereo pair having depth information between different views, a stereo pair having depth information which corresponds to sizes of reproducing apparatuses |

The 3D display parameter (Enable3D) may include information about a 2D/3D display of a current multiview still image inserted into current multiview still image data.

For example, when there is no problem in three-dimensionally outputting the current multiview still image, the multiview still image service providing apparatus 100 may set the 3D display parameter (Enable3D) as 1. The multiview still image service receiving apparatus 200 may restore multiple view images of the current multiview still image according to the 3D display parameter (Enable3D) set as 1 and may three-dimensionally output the multiple view images.

As another example, when the current multiview still image data is inappropriate for three-dimensional reproduction of the current multiview still image, the multiview still image service providing apparatus 100 may set the 3D output parameter (Enable3D) as 0. For example, when disparity of the current multiview still image is considerable, the disparity may cause visual fatigue in a viewer who watches a 3D display screen of the current multiview still image for a longtime, thus, the 3D output parameter (Enable3D) may be set as 0. The multiview still image service receiving apparatus 200 may two-dimensionally and compulsively output the current multiview still image according to the 3D output parameter (Enable3D) set as 0.

However, in a case where a user setting precedes the 3D output parameter (Enable3D), the 2D/3D output manner may be selected by a user, regardless of the 3D output parameter (Enable3D).

The 3D image format parameter (FormatStyle) may include information about the 3D image format of the current multiview still image.

Table 2 shows semantic examples of the 3D image format parameter (FormatStyle).

TABLE 2

| FormatStyle | Details |
|---|---|
| 0 | stereoscopic image format |
| 1 | multiview image format |
| 2 | composition image format |
| 3 | stereoscopic image + depth map format |
| 4 | multiview image + depth map format |
| 5 | composition image + depth map format |
| 6 | stereoscopic image + disparity map format |

TABLE 2-continued

| FormatStyle | Details |
|---|---|
| 7 | multiview image + disparity map format |
| 8 | composition image + disparity map format |
| 9-255 | (reserved) |

The 3D image format may include a stereoscopic image format formed of individual left-view image frames and right-view image frames, a multiview image format formed of three or more multiview images, and a composition image format in which left-view image information and right-view image information are included in one frame. The side-by-side format and the top and bottom format may correspond to the composition image format, and the frame sequential format and the field sequential format may correspond to the stereoscopic image format.

Also, the 3D image format may further include a format formed by adding a depth map or a disparity map to a stereoscopic image, a multiview image, or a composition image.

The multiview still image service receiving apparatus 200 may predict the 3D image format of the current multiview still image by using the 3D image format parameter (FormatStyle), and may restore each of the multiple view images from a multiview still image.

For example, when 3D reproduction of a multiview still image is requested, the multiview still image service receiving apparatus 200 may selectively restore a multiview still image whose 3D image format parameter (FormatStyle) indicates a multiview image format and may reproduce the multiview still image.

Also, when 3D reproduction with a free view is requested, the multiview still image service receiving apparatus 200 may search for a multiview still image having a 3D image format and including a depth map or a disparity map as the 3D image format parameter (FormatStyle), may perform depth image-based 3D rendering, and thus may three-dimensionally reproduce the multiview still image with a free view.

The priority view parameter (IsLeftFirst) may include information about a priority view of the current multiview still image. For example, when the current multiview still image has a composition image format, the multiview still image service receiving apparatus 200 indicates whether precedent image information from among a plurality of pieces of multiview image information forming the current multiview still image is left-view image information or right-view image information.

The horizontal value to original aspect ratio parameter (OriginalAspectratioX) and the vertical value to original aspect ratio parameter (OriginalAspectratioY) may respectively include information about a horizontal value and information about a vertical value of an aspect ratio of an original image of a predetermined view image from among multiple view images forming the current multiview still image. The horizontal value to original aspect ratio parameter (OriginalAspectratioX) and the vertical value to original aspect ratio parameter (OriginalAspectratioY) may indicate a horizontal width value of the original image, and a vertical height value of the original image, respectively.

In a multiview still image having the composition image format, two or more-view frames are composed to form one frame, so that a width or a height of each of multiple view images may differ from an original image while multiple view images are enlarged or reduced. Accordingly, if an original aspect ratio is not considered in a post-process for 3D reproduction of the multiview still image, the multiview still image may be inappropriately reproduced in a 3D manner. Hereinafter, with reference to FIGS. 9 and 10, the consideration of the original aspect ratio will be explained.

Figure 9:
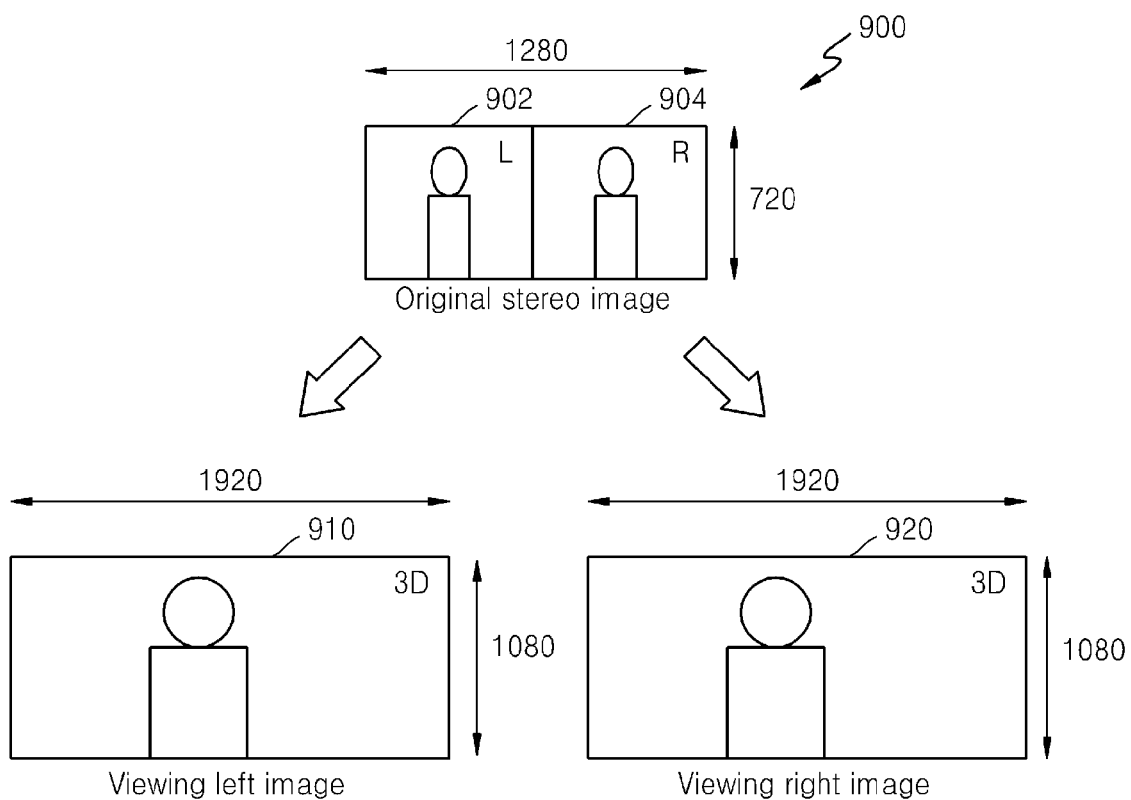
FIG. 9 illustrates an example in which a multiview still image is enlarged and reproduced at the same aspect ratio according to an exemplary embodiment.

FIG. 9 illustrates an example in which a multiview still image is enlarged and reproduced at the same aspect ratio.

An original 3D image 900 is a 3D still image having a side-by-side format and includes a left-view image 902 and a right-view image 904. A size of the original 3D image 900 is 1280 (width)×720 (height), and its original aspect ratio is 16:9. In order to three-dimensionally reproduce the original 3D image 900 via a 3D display device of 1920 (width)×1080 (height), the original 3D image 900 is enlarged to 1920 (width)×1080 (height) and then each of the left-view image 902 and the right-view image 904 is enlarged to 1920 (width)×1080 (height) and is restored, so that a first left-view image 910 and a first right-view image 920 with a size of 1920 (width)×1080 (height) may be generated. Since an aspect ratio of the first left-view image 910 and the first right-view image 920 is equivalent to 16:9 that is the aspect ratio of the original 3D image 900, the left-view image 902 and the right-view image 904 of the original 3D image 900 may be enlarged to match with a screen size of the 3D display device of 1920 (width)×1080 (height).

Figure 10:
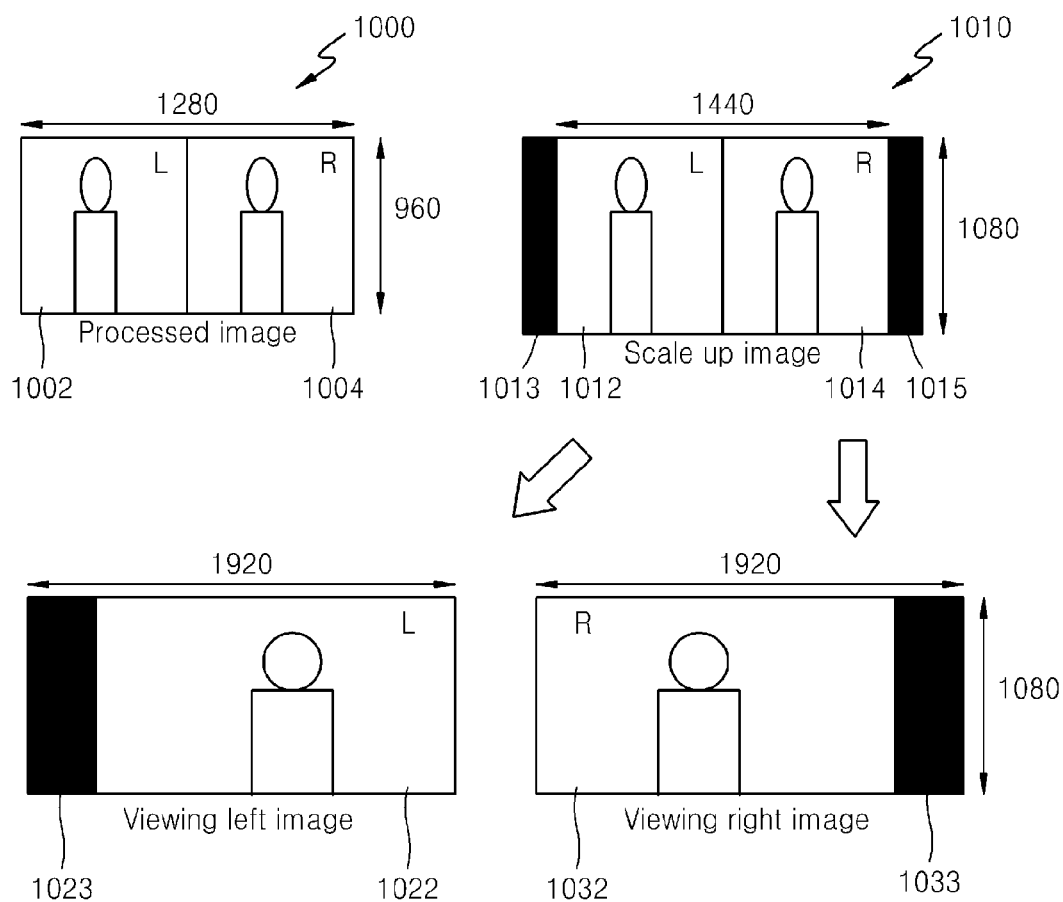
FIG. 10 illustrates an example in which an error occurs due to outputting a multiview still image without consideration of an aspect ratio according to an exemplary embodiment.

FIG. 10 illustrates an example in which an error occurs due to outputting a multiview still image without consideration of an aspect ratio.

In a case where the original 3D image 900 having the size of 1280 (width)×720 (height) and the original aspect ratio of 16:9 is enlarged to a second 3D image 1000 having a size of 1280 (width)×960 (height), an aspect ratio of the second 3D image 1000 is 4:3 that differs from the original aspect ratio (16:9) of the original 3D image 900.

When the second 3D image 1000 is enlarged to be reproduced in a 3D display device of 1920 (width)×1080 (height), the aspect ratio of the second 3D image 1000 is enlarged while maintaining the aspect ratio of 4:3, such that a height and a width of the second 3D image 1000 are limited to 1080 and 1440, respectively. Thus, a third 3D image 1010 having a size of 1440 (width)×1080 (height) may be generated. However, in this case, the width of the third 3D image 1010 is smaller than a width of the 3D display device of 1920 (width)×1080 (height), such that spaces 1013 and 1015 that are not filled with the third 3D image 1010 occur.

When a second left-view image 1002 and a second right-view image 1004 of the third 3D image 1010 are enlarged to be reproduced in the 3D display device of 1920 (width)×1080 (height), a third left-view image 1022 and a third right-view image 1032, each having an aspect ratio of 4:3 and a size of 1440 (width)×1080 (height), are generated. Thus, spaces 1023 and 1033 that are not filled with the third left-view image 1022 and the third right-view image 1032 occur on a screen of the 3D display device of 1920 (width)× 1080 (height) and an original aspect ratio of 16:9. Due to the spaces 1023 and 1033, a disparity between views of the third left-view image 1022 and the third right-view image 1032 differs from a disparity between views of the left-view image 902 and the right-view image 904, such that correct 3D reproduction is not possible.

The multiview still image service providing apparatus 100 may insert information about an aspect ratio of an original image into headers of the multiview still image file. The information about an aspect ratio of an original image may include the horizontal value to original aspect ratio parameter (OriginalAspectratioX) and the vertical value to original aspect ratio parameter (OriginalAspectratioY).

The multiview still image service receiving apparatus 200 may obtain the information about the aspect ratio of the original image from the horizontal value to original aspect ratio parameter (OriginalAspectratioX) and the vertical value to original aspect ratio parameter (OriginalAspectratioY) and thus may compare an aspect ratio of a restored 3D still image with the aspect ratio of the original image. When the aspect ratio of the restored 3D still image does not match with the aspect ratio of the original image, the multiview still image service receiving apparatus 200 may perform a post-process to adjust a size of the restored 3D still image, in consideration of the aspect ratio of the original image and a size of the screen of the 3D display device, so that the restored 3D still image may be correctly reproduced via the 3D display device in a 3D manner.

The view order parameter (ViewOrderinginfo) may include information about an arrangement order of views of the current multiview still image. When the current multiview still image includes left and right-view images, the view order parameter (ViewOrderinginfo) may indicate an arrangement of the left and right-view images.

For example, when the view order parameter (ViewOrderinginfo) about multiple view images that are sequentially arranged in a left-to-right direction is set as 0, a view index (view_index[i]) of the multiple view image positioned farthest left may be set as 0, and a view index of each of view images that are positioned more to the right side compared to a current view image may be increased by 1. Also, when the view order parameter (ViewOrderinginfo) is set as 1, a view index of the multiple view image positioned farthest right may be set as 0, and a view index of each of view images that are positioned more to the left side compared to the current view image may be increased by 1.

View index information indicates index information of each of the multiple view images. According to indexes of the multiple view images, an arrangement order of views set by the view order parameter (ViewOrderinginfo) may be determined.

The main-view index parameter (MainViewindex) may include information about an index of a main-view from among the views of the current multiview still image. The multiview still image service receiving apparatus 200 may extract a main-view image from the image data areas 751, 753, and 755 of the first image area 701 of the multiview still image file format 700 or the image data areas 851, 853, and 855 of the first image area 801 of the multiview still image file format 800. A still image reproducing apparatus according to the related art reads only the first image area 701 of the image areas 701, 703, and 705 of the multiview still image file format 700, or the first image area 801 of the image areas 801, 803, and 805 of the multiview still image file format 800, and cannot read the rest of the image areas 703 and 705 or the image areas 803 and 805. However, the multiview still image service receiving apparatus 200 may recognize the main-view image from the first image area 701 or 801 as a 2D still image and may extract the main-view image.

The view number parameter (NumOfView) may include information about the total number of the views of the current multiview still image.

The image area offset parameter (ViewOffset[i]), the 3D image format configuring element parameter (ViewFormat [i]), and the multipath parameter (Multipathinfo[i]) are about a form in which multiple views of the current multiview still image are configured.

The image area offset parameter (ViewOffset[i]) may include information about a distance between a start point of each of the multiview still image file formats 700 and 800 and each of the image areas 701, 703, 705, 801, 803, and 805. The image area offset parameter (ViewOffset[i]) may be an address from a predetermined position of the multiview still image file format 700 or 800 to an image start area (an SOI area) 711, 713, 715, 811, 813, or 815 of a current image area (i.e., the image area) 701, 703, 705, 801, 803, or 805 in which a current view image is stored, and may be expressed in bytes. For example, when the current view image is a main-view image, the current image area indicates the first image areas 701 and 801, and thus, the image area offset parameter (ViewOffset[i]) may be set as 0.

The 3D image format configuring element parameter (ViewFormat[i]) may include information about format configuring elements of a plurality of pieces of image information that configure a 3D image format. The 3D image format of the current multiview still image may include a stereoscopic image format, a multiview image format, a composition image format, and a depth map (or a disparity map) addition format. The 3D image format configuring element parameter (ViewFormat[i]) may indicate whether each of the plurality of pieces of image information for configuring the 3D image format is one of multiple view images including a left-view image, a right-view image, and a predetermined-view image which are used to configure the 3D image format, an image of a difference between views, a depth map/disparity map, and a composition image.

When one or more stereo pairs formed by the plurality of pieces of image information include a stereo pair having depth information between different views, the multipath parameter (Multipathinfo[i]) may include information that indicates a stereo pair having depth information between views that correspond to sizes of reproducing apparatuses.

The multiview still image data may include three or more multiple view images including a stereo pair of multiple view images having a large depth difference between views, and a stereo pair of multiple view images having a small depth difference between views. A multipath method refers to a method of selectively outputting multiple view images of a stereo pair which are appropriate for a reproduction environment of the 3D display device, by using the multiview still image data.

Figure 11:
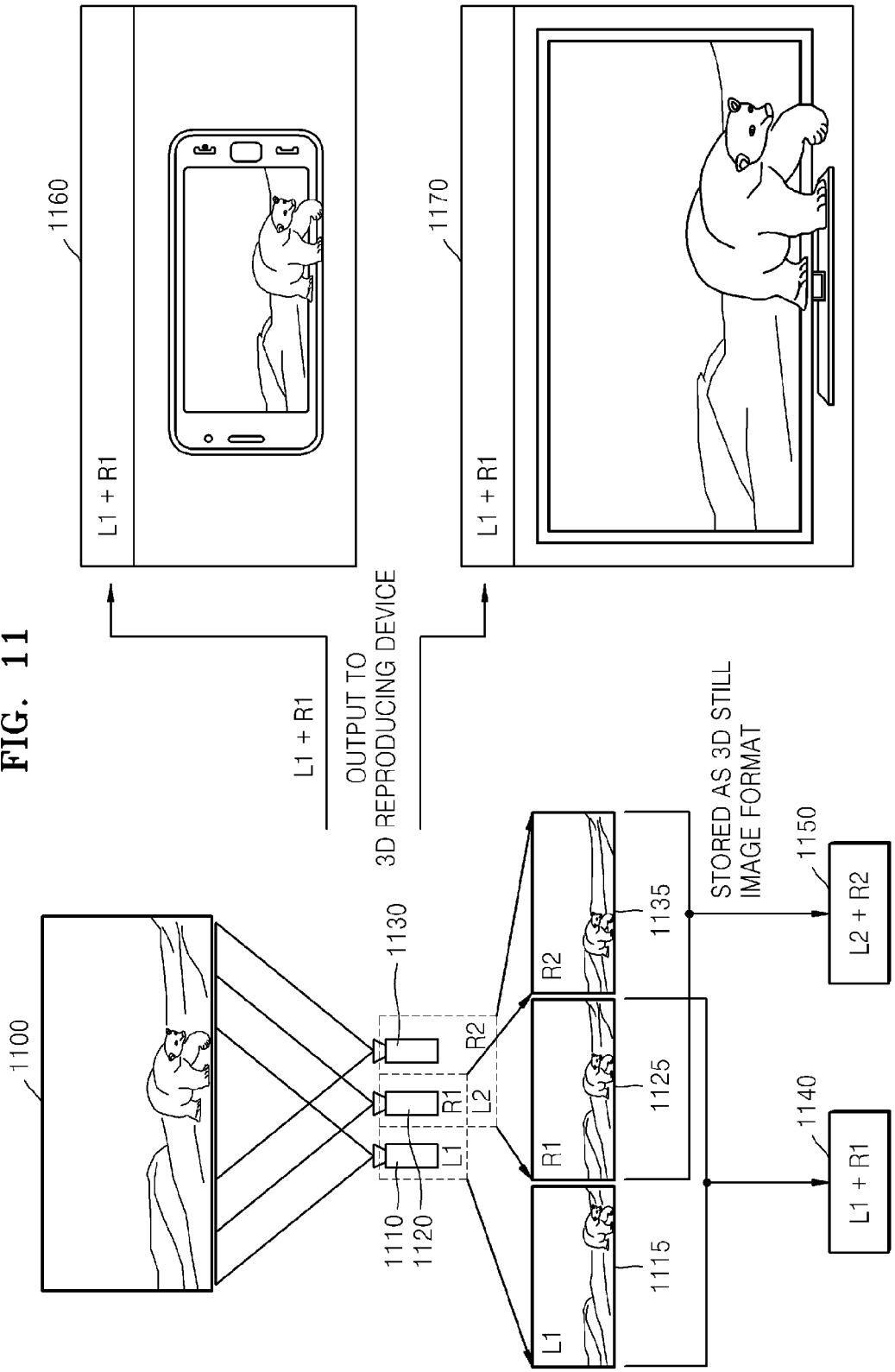
FIG. 11 illustrates an example in which a stereo pair is selected and output, according to a size of a reproducing device based on multipath information according to an exemplary embodiment.

FIG. 11 illustrates an example in which a stereo pair is selected and output, according to a size of a reproducing device based on multipath information.

For example, three cameras 1110, 1120, and 1130 may capture a target object 1100 via a stereo multi-shot, so that three-view images 1115, 1125, and 1135 may be obtained, respectively.

Multiple view images that are obtained via sequential cameras may form a stereo pair. For example, when the image 1115 obtained via the first camera 1110 becomes a left-view image L1, and the image 1125 obtained via the second camera 1120 becomes a right-view image R1, a first stereo pair of the left-view image L1 1115 and the right-view image R1 1125 may be formed. When the image 1125 obtained via the second camera 1120 becomes a left-view image L2, and the image 1135 obtained via the third camera 1130 becomes a right-view image R2, a second stereo pair of the left-view image L2 1125 and the right-view image R2 1135 may be formed.

Thus, images that form a stereo pair and that are from among the three-view images 1115, 1125, and 1135 obtained via the three cameras 1110, 1120, and 1130 may be selectively inserted into a 3D still image file format. The first stereo pair of the left-view image L1 1115 and the right-view image R1 1125 may be stored in a first 3D still image file format 1140, and the second stereo pair of the left-view image L2 1125 and the right-view image R2 1135 may be stored in a second 3D still image file format 1150.

Also, the images that form the stereo pair and that are from among the three-view images 1115, 1125, and 1135 may be selected based on a size of a depth between views. When the image 1115 obtained via the first camera 1110 becomes the left-view image L1, and the image 1125 obtained via the second camera 1120 becomes the right-view image R1, a third stereo pair of the left-view image L1 1115 and the right-view image R2 1135 may be formed. When a main-view image is the image 1115, a depth between views of the third stereo pair of the left-view image L1 1115 and the right-view image R2 1135 is greater than a depth between views of the first stereo pair of the left-view image L1 1115 and the right-view image R1 1125.

If multiview images having a large depth difference between views are three-dimensionally reproduced in a 3D display device 1170 having a large screen, user visual fatigue becomes considerable, compared to a 3D display device 1160 having a small screen. Thus, if stereo pairs having different depths between views exist, a stereo pair is selected based on a size of a screen of a 3D display device.

For example, the third stereo pair of the left-view image L1 1115 and the right-view image R2 1135 which have a great depth difference between views may be selectively reproduced by the 3D display device 1160 having a small screen, and the first stereo pair of the left-view image L1 1115 and the right-view image R1 1125 which have a small depth difference between views may be selectively reproduced by the 3D display device 1170 having a large screen.

When the left-view image L1 1115 is a main-view image, the multiview still image service providing apparatus 100 may set the multipath parameter (Multipathinfo[i]) indicating the first stereo pair of the left-view image L1 1115 and the right-view image R1 1125 as 0, and may set the multipath parameter (Multipathinfo[i]) indicating the third stereo pair of the left-view image L1 1115 and the right-view image R2 1135 as 1.

When the left-view image L1 1115 is the main-view image, and the multipath parameter (Multipathinfo[i]) is set as 0, the multiview still image service receiving apparatus 200 may restore the first stereo pair of the left-view image L1 1115 and the right-view image R1 1125 which have the small depth difference between views and may output the left-view image L1 1115 and the right-view image R1 1125 by using the 3D display device 1170 having the large screen. When the multipath parameter (Multipathinfo[i]) is set as 1, the multiview still image service receiving apparatus 200 may restore the third stereo pair of the left-view image L1 1115 and the right-view image R2 1135 which have the great depth difference between views and may output the left-view image L1 1115 and the right-view image R2 1135 by using the 3D display device 1160 having the small screen. That is, in order to search for a stereo pair having a depth between views which is appropriate for the sizes of the 3D display devices 1160 and 1170, the multiview still image service receiving apparatus 200 may read and search for the multipath parameter (Multipathinfo [i]).

Also, because the total number of views of a current multiview still image, the total number of image area offsets, the total number of configuring elements that configure a 3D image format, and the total number of stereo pairs correspond to each other, the view number parameter (NumOfView) may indicate the total number of image area offset parameters (ViewOffset[i]), the total number of 3D image format configuring element parameter (ViewFormat [i]), and the total number of multipath parameters (MultipathInfo[i]).

The multiview still image service providing apparatus 100 and the media file format-based multiview still image service providing apparatus 300 may insert 3D additional attribute information together with a plurality of pieces of image information about multiple view images forming a multiview still image into a header of multiview still image data. That is, the 3D additional attribute information may be individual attribute information used to restore current image information from among the plurality of pieces of image information to multiple view images and then to three-dimensionally reproduce the multiple view images.

The multiview still image service receiving apparatus 200 and the media file format-based multiview still image service receiving apparatus 400 may extract the 3D additional attribute information together with the plurality of pieces of image information about multiple view images forming a multiview still image from the header of the multiview still image data, may restore the multiple view images, may perform a post-process thereon, and then may three-dimensionally reproduce the multiple view images.

Tables 3 and 4 show examples of the 3D additional attribute information.

TABLE 3

| 3D additional attribute information | | Details |
|---|---|---|
| 3D image format-related parameter | ViewFormat | 3D image format configuring elements of current image information from among a plurality of pieces of image information |
| camera parameter | — | information about a camera that obtained a multiview still image |
| vertical disparity parameter | RepresentativeMaxVerDisparity | efficient minimum vertical disparity of a current view image |
| | RepresentativeMinVerDisparity | efficient maximum vertical disparity of a current view image |
| low fatigue parameter | RepresentativeMinDisparity | efficient minimum vertical disparity of a current view image, compared to a main-view image |
| | MainObjectDisparity | Disparity of a reference object in automatic focus convergence |
| | RepresentativeMaxDisparity | efficient maximum vertical disparity of a current view image, compared to a main-view image |
| | ExpectedHorDisplaySize | width of an expected display device |
| | ExpectedVerDisplaySize | height of an expected display device |
| | ExpectedViewingDistanceMin | minimum value of an expected viewing distance |
| | ExpectedViewingDistanceOptimal | optimal value of an expected viewing distance |
| | ExpectedViewingDistanceMax | maximum value of an expected viewing distance |
| imbalance parameter | ImbalanceOffset[i] | imbalanced pixel value of a current view image, compared to a main-view image |

TABLE 4

| 3D additional attribute information | | Details |
|---|---|---|
| occlusion-related parameter | BoundaryOccludedWidth | size of an occlusion area that occurs at a boundary of a current view image in comparison to a reference view image |
| | OcclusionDirection | direction of the boundary at which the occlusion area occurs |
| | NumOfStereoPair | the number of pieces of information forming a stereo pair with a current view image of current image information from among a plurality of pieces of image information |
| automatic focus convergence-related parameter | PairedViewId[i] | view index of at least one paired view image forming a stereo pair with a current view image of current image information from among a plurality of pieces of image information |
| | CurCropSizeX[i] | width of a reproduction image of a current view image |
| | CurCropSizeY[i] | height of a reproduction image of a current view image |
| | CurCropOffsetX[i] | horizontal coordinates of a reproduction image of a current view image |
| | CurCropOffsetY[i] | vertical coordinates of a reproduction image of a current view image |

TABLE 4-continued

| 3D additional attribute information | Details |
| --- | --- |
| PairedCropSizeX[i] | width of a reproduction image of a paired view image |
| PairedCropSizeY[i] | height of a reproduction image of a paired view image |
| PairedCropOffsetX[i] | horizontal coordinates of a reproduction image of the other view image |
| PairedCropOffsetY[i] | vertical coordinates of a reproduction image of the other view image |

The 3D additional attribute information may include a current 3D image format configuring element parameter (ViewFormat), a camera parameter, an efficient minimum vertical disparity parameter (RepresentativeMinVerDisparity), an efficient maximum vertical disparity parameter (RepresentativeMaxVerDisparity), an efficient minimum disparity parameter (RepresentativeMinDisparity), a reference object disparity parameter (MainObjectDisparity), an efficient maximum disparity parameter (RepresentativeMaxDisparity), an expected display width parameter (ExpectedHorDisplaySize), an expected display height parameter (ExpectedVerDisplaySize), a minimum expected viewing distance parameter (ExpectedViewingDistanceMin), an optimal expected viewing distance parameter (ExpectedViewingDistanceOptimal), a maximum expected viewing distance parameter (ExpectedViewingDistanceMax), an imbalance offset parameter (ImbalanceOffset[i]), a boundary occlusion width parameter (BoundaryOccludedWidth), an occlusion direction parameter (OcclusionDirection), a number of stereo-pair parameter (NumOfStereoPair), a paired view index parameter (PairedViewId[i]), a current view reproduction width parameter (CurCropSizeX [i]), a current view reproduction height parameter (CurCropSizeY[i]), a current view reproduction horizontal offset parameter (CurCropOffsetX[i]), a current view reproduction vertical offset parameter (CurCropOffsetY[i]), a paired view reproduction horizontal parameter (PairedCropSizeX[i]), a paired view reproduction vertical parameter (PairedCropSizeY[i]), a paired view reproduction horizontal offset parameter (PairedCropOffsetX[i]), a paired view reproduction vertical offset parameter (PairedCropOffsetY[i]), and the like.

The current 3D image format configuring element parameter (ViewFormat) may include information about format configuring elements of current image information which configure a 3D image format. Since the 3D image format of a current multiview still image may include a stereoscopic image format, a multiview image format, a composition image format, and a depth map (disparity map) addition format, the current image information for forming the current multiview still image may be one of multiple view images forming the 3D image format and including a left-view image, a right-view image, and a predetermined view image, an image of a difference between views, a depth map/disparity map image, and a composition image.

Table 5 illustrates semantic examples of the current 3D image format configuring element parameter (ViewFormat).

TABLE 5

| current 3D image format configuring element parameter (ViewFormat) | Details |
| --- | --- |
| 0 | left-view image of a stereoscopic image format |
| 1 | right-view image of a stereoscopic image format |
| 2 | multiview image |
| 3 | depth map |
| 4 | disparity map |
| 5 | side-by-side format of a composition image format |
| 6 | top and bottom format of a composition image format |
| 7 | vertical line interleaved format of a composition image format |
| 8 | horizontal line interleaved format of a composition image format |
| 9 | checker-board format of a composition image format |
| 10-255 | (reserved) |

Table 6 illustrates semantic examples of the camera parameter.

```
unsigned int(32) translation[3];
    unsigned int(32) focal_length;
    unsigned int(32) aspect_ratio;
    unsigned int(3) reserved = 0;
    unsigned int(1) is_camera_cross;
    unsigned int(3) reserved = 0;
    unsigned int(1) is_principal_point;
    if (is_camera_cross){
        unsigned int(32) rotation[3];
    }
    if (is_principal_point){
        unsigned int(16) principal_point_x;
        unsigned int(16) principal_point_y;
    }
```

The camera parameter may include a parallel movement parameter (translation[3]) including information about parallel movement distances of a 3D camera in X, Y, and Z axis directions, a focal distance parameter ($focal_{13}$ length) including information about a focal distance of the 3D camera, an aspect ratio parameter (aspect_ratio) including information about an aspect ratio of the 3D camera, a cross camera parameter (is_camera_cross) indicating whether the 3D camera is a cross type, a principal point parameter (is_principal_point) indicating whether a predetermined point is a principal point, a rotation angle parameter (rotation [3]) including information about rotation angles of a cross-type camera in X, Y, and Z axis directions, and a principal-point horizontal component parameter (principal_point_x) and a principal-point vertical component parameter (principal_point_y) which include information about a horizontal component and a vertical component of a principal point.

If a current 3D camera is not a cross type, the rotation angle parameter (rotation[3]) of the camera parameter may be omitted. If a predetermined point is not a principal point, the principal-point horizontal component parameter (principal_point_x) and the principal-point vertical component parameter (principai_point_y) of the camera parameter may be omitted.

The efficient minimum vertical disparity parameter (RepresentativeMinVerDisparity) and the efficient maximum vertical disparity parameter (RepresentativeMaxVerDisparity) of the 3D additional attribute information may be vertical disparity parameters of a current view image of current image information and may include information about an efficient minimum vertical disparity of the current view image, and information about an efficient maximum vertical disparity of the current view image, respectively.

In a case where a 3D image is captured by using a stereoscopic camera that is not correctly fixed, a vertical disparity may occur. The vertical disparity of a 3D image may cause viewer fatigue when the 3D image is three-dimensionally reproduced. Compared to a large-screen 3D display device, allowance with respect to a vertical disparity of a small-screen 3D display device is great.

The multiview still image service receiving apparatus 200 may read efficient minimum and maximum vertical disparity of the current view image, based on the efficient minimum vertical disparity parameter (RepresentativeMinVerDisparity) and the efficient maximum vertical disparity parameter (RepresentativeMaxVerDisparity). The multiview still image service receiving apparatus 200 may restore multiple view images, may compare the efficient minimum and maximum vertical disparity of the current view image with allowance of a vertical disparity of a current 3D display device, and thus may selectively reproduce only an image having a vertical disparity that is equal to or less than the allowance of the vertical disparity of the current 3D display device.

The efficient minimum vertical disparity parameter (RepresentativeMinVerDisparity), the efficient maximum vertical disparity parameter (RepresentativeMaxVerDisparity), the efficient minimum disparity parameter (RepresentativeMinDisparity), the reference object disparity parameter (MainObjectDisparity), the efficient maximum disparity parameter (RepresentativeMaxDisparity), the expected display width parameter (ExpectedHorDisplaySize), the expected display height parameter (ExpectedVerDisplaySize), the minimum expected viewing distance parameter (ExpectedViewingDistanceMin), the optimal expected viewing distance parameter (ExpectedViewingDistanceOptimal), and the maximum expected viewing distance parameter (ExpectedViewingDistanceMax) of the 3D additional attribute information may be low fatigue parameters and may include information to reduce fatigue that may occur in a viewer when the current view image is three-dimensionally reproduced.

The efficient minimum disparity parameter (RepresentativeMinDisparity) and the efficient maximum disparity parameter (RepresentativeMaxDisparity) may respectively include information about an efficient minimum disparity and information about an efficient maximum disparity of the current view image, compared to a main-view image. For example, in the current view image that captured a 3D space, disparity compared to a main-view image of the farthest object in a rear direction from among objects in the 3D space may be the efficient minimum disparity, and disparity compared to a main-view image of the closest object in a front direction from among the objects may be the efficient maximum disparity.

The reference object disparity parameter (MainObjectDisparity) may include information about disparity of a reference object. The multiview still image service receiving apparatus 200 may restore multiple view images and then may perform an automatic focus convergence operation to adjust both a focus and a convergence point to be positioned on a screen, by adjusting the disparity of the reference object which is read from the reference object disparity parameter (MainObjectDisparity).

Disparity values of the efficient minimum disparity parameter (RepresentativeMinDisparity), the reference object disparity parameter (MainObjectDisparity), and the efficient maximum disparity parameter (RepresentativeMaxDisparity) may be expressed in quarter pel units.

Figure 12:
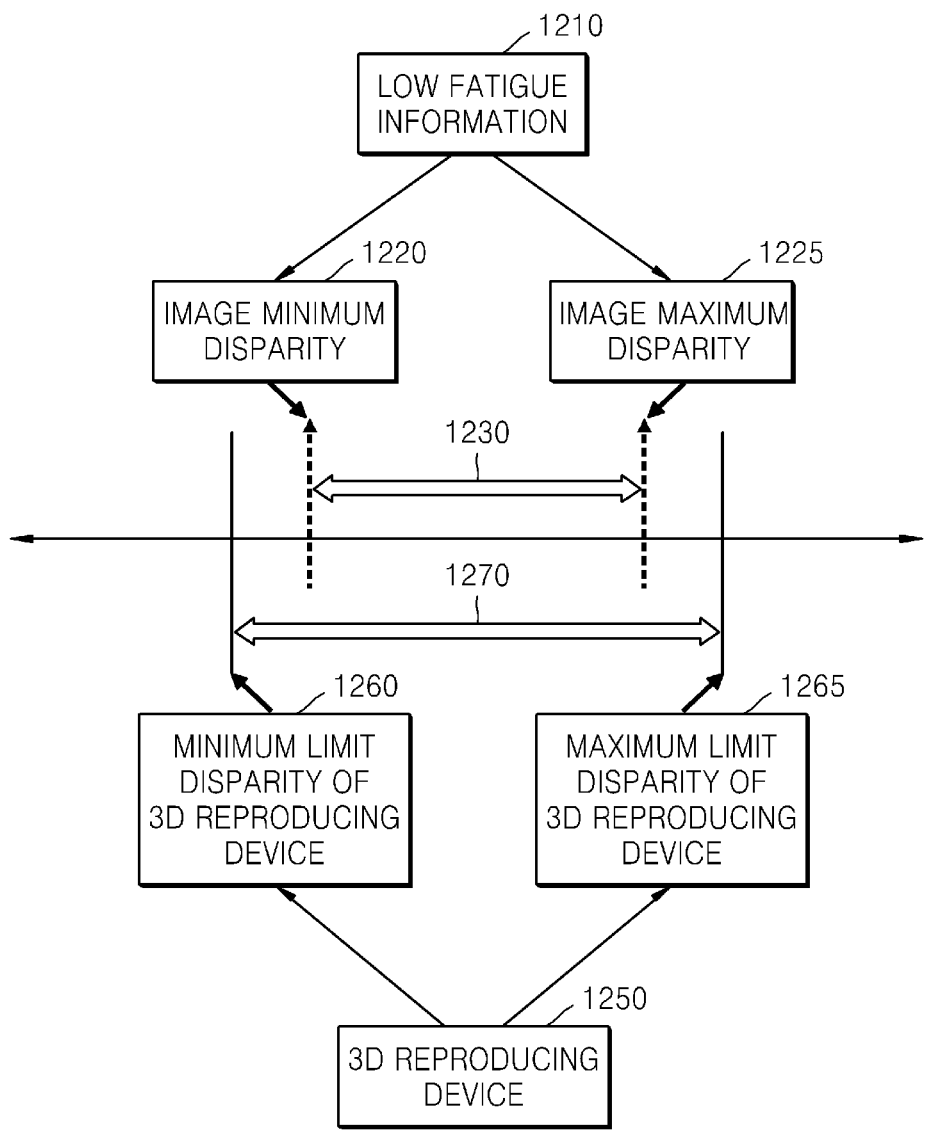
FIG. 12 illustrates an example of low fatigue information according to an exemplary embodiment.

FIG. 12 illustrates an example of low fatigue information.

According to whether disparity of a 3D image is included in allowance of a positive (+) direction or in allowance of a negative (−) direction, with respect to disparity of a screen, fatigue may occur in a user who watches the 3D image that is three-dimensionally reproduced.

The multiview still image service receiving apparatus 200 may read an efficient minimum disparity 1220 and an efficient maximum disparity 1225 of a current 3D image from the efficient minimum disparity parameter (RepresentativeMinDisparity) and the efficient maximum disparity parameter (RepresentativeMaxDisparity) from among low fatigue information 1210 of the 3D additional attribute information.

The multiview still image service receiving apparatus 200 may analyze a minimum limit disparity 1260 and a maximum limit disparity 1265 of a 3D reproducing device 1250 by using a screen size and resolution of the 3D reproducing device 1250.

Thus, if a disparity period 1230 of the current 3D image which is between an efficient minimum disparity 1220 and an efficient maximum disparity 1225 of the current 3D image is included in a period of the 3D reproducing device 1250 which is between the minimum limit disparity 1260 and the maximum limit disparity 1265 of the 3D reproducing device 1250, the user may watch, without fatigue, the current 3D image that is three-dimensionally reproduced via the 3D reproducing device 1250.

Also, the multiview still image service receiving apparatus 200 may restore multiple view images and then may perform a post-process in which disparity of a reference object which is read from the reference object disparity parameter (MainObjectDisparity) is adjusted to 0 while disparity of an entire 3D image is adjusted, so that viewing fatigue due to a mismatch between a focus position with respect to focal accommodation and a convergence position with respect to binocular parallax may be reduced.

The expected display width parameter (ExpectedHorDisplaySize) and the expected display height parameter (ExpectedVerDisplaySize) may respectively include information about a display width and a display height which are optimal to three-dimensionally reproduce the current view image. The multiview still image service receiving apparatus 200 may search for a 3D image that is optimized with respect to a size of a current 3D reproducing device, based on the expected display width parameter (ExpectedHorDisplaySize) and the expected display height parameter (ExpectedVerDisplaySize).

If the information about the display width and the display height which are optimal for the current view image is different from the size of the current 3D reproducing device, the multiview still image service receiving apparatus 200 may perform a post-process to adjust a depth of the current view image, by using a width and height of an optimal 3D display device of the current view image and a width and height of the current 3D reproducing device, and then may three-dimensionally reproduce the current view image.

Also, the multiview still image service receiving apparatus 200 may display a notice, which asks whether to display the current view image by using the current 3D reproducing device that does not have an optimal size, on a screen without performing the post-process. In this case, the multiview still image service receiving apparatus 200 may induce the user to select whether to stably reproduce a 3D still image in a 2D manner or to three-dimensionally reproduce the 3D still image even though the 3D reproduction may cause fatigue.

The minimum expected viewing distance parameter (ExpectedViewingDistanceMin), the optimal expected viewing distance parameter (ExpectedViewingDistanceOptimal), and the maximum expected viewing distance parameter (ExpectedViewingDistanceMax) of the 3D additional attribute information may include information about a minimum value, an optimal value, and a maximum value of an expected viewing distance, respectively. The multiview still image service receiving apparatus 200 may induce the user to watch a 3D image at a position allowing the user to exactly experience a 3D effect of the current view image or may inform the user about an expected viewing distance, according to the minimum expected viewing distance parameter (ExpectedViewingDistanceMin), the optimal expected viewing distance parameter (ExpectedViewingDistanceOptimal), and the maximum expected viewing distance parameter (ExpectedViewingDistanceMax).

The imbalance offset parameter (ImbalanceOffset[i]) may include information about chrominance of the current view image, compared to a main-view image. Although a 3D image is captured by using cameras having the same function, a left-view image and a right-view image having chrominance therebetween may be obtained. The reason for the chrominance may be due to a phenomenon in which light is not diffused but reflected in a predetermined direction or due to a minute difference in camera setting. When pixel values of color components of the left-view image and the right-view image do not match each other, fatigue due to 3D reproduction may occur in the user.

The imbalance offset parameter (ImbalanceOffset[i]) may include information about a difference between the current view image and a reference view image for each of R/G/B color channels (or Y/U/V color channels) in a RGB color format (or an YUV color format).

The multiview still image service receiving apparatus 200 may restore multiple view images, may perform a post-process to adjust chrominance between the current view image and the reference view image based on the imbalance offset parameter (ImbalanceOffset[i]), and thus may three-dimensionally reproduce the current view image.

The boundary occlusion width parameter (BoundaryOccludedWidth) and the occlusion direction parameter (OcclusionDirection) of the 3D additional attribute information may be related to an occlusion and may include information about an occlusion area that occurs at a boundary between the reference view image and the current view image.

The boundary occlusion width parameter (BoundaryOccludedWidth) may include information about a width of the occlusion area of the current view image in a stereoscopic image formed of a left-view image and a right-view image. The occlusion direction parameter (OcclusionDirection) may include information about a direction in which the occlusion area occurs in the current view image. For example, when the occlusion area occurs at a left boundary area or a right boundary area of the current view image, the occlusion direction parameter (OcclusionDirection) may be set as 0 or 1.

Figure 13:
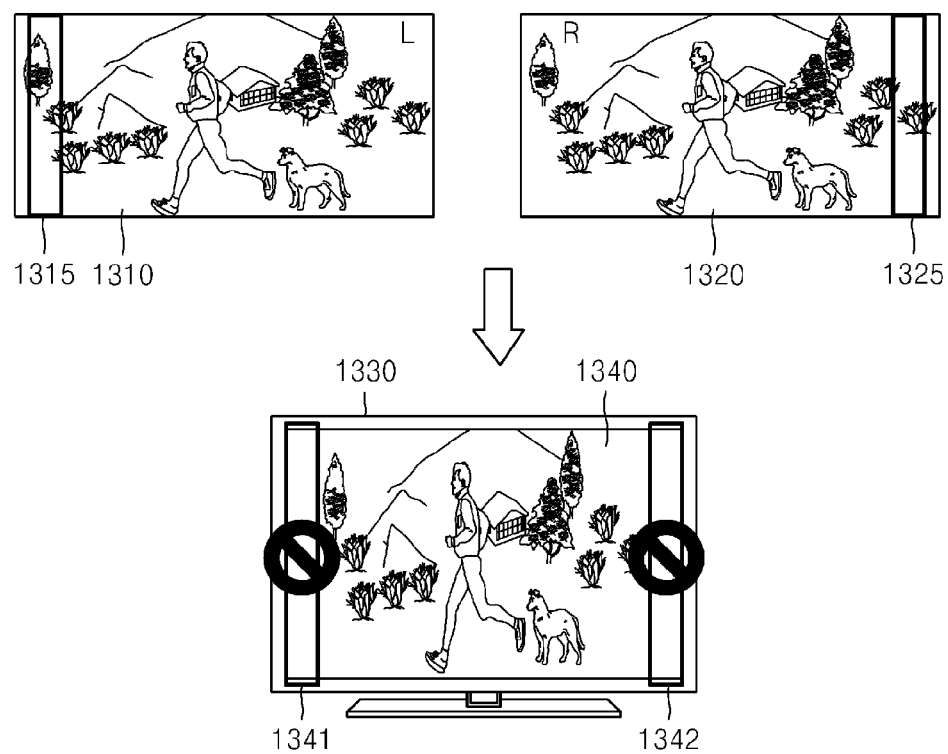
FIG. 13 illustrates examples of an output screen after a post-process based on information about an occlusion-related boundary area according to an exemplary embodiment.

FIG. 13 illustrates examples of an output screen after a post-process based on information about an occlusion-related boundary area.

In a left-view image 1310 and a right-view image 1320 which form a stereoscopic image, an occlusion area 1315 may occur at a left boundary of the left-view image 1310, and an occlusion area 1325 may occur at a right boundary of the right-view image 1320.

If a 3D display device 1330 three-dimensionally reproduces the left-view image 1310 and the right-view image 1320 without performing any process on the occlusion area 1315 of the left-view image 1310 or the occlusion area 1325 of the right-view image 1320, a left occlusion area 1341 of a 3D reproduction screen 1340 is viewed by only a left eye, and a right occlusion area 1342 is viewed by only a right eye, and thus, a user may feel fatigue. Also, the left occlusion area 1341 and the right occlusion area 1342 of the 3D reproduction screen 1340 are two-dimensionally viewed at left and right ends of a screen of the 3D display device 1330, without creating a 3D effect, and thus, the user may experience incongruity.

Thus, the multiview still image service receiving apparatus 200 may restore multiple view images, may read a width and direction of an occlusion area based on the boundary occlusion width parameter (BoundaryOccludedWidth) and the occlusion direction parameter (OcclusionDirection), may perform a post-process to prevent reproduction of the left and right occlusion areas 1341 and 1342, and then may three-dimensionally reproduce the stereoscopic image.

Figure 14:
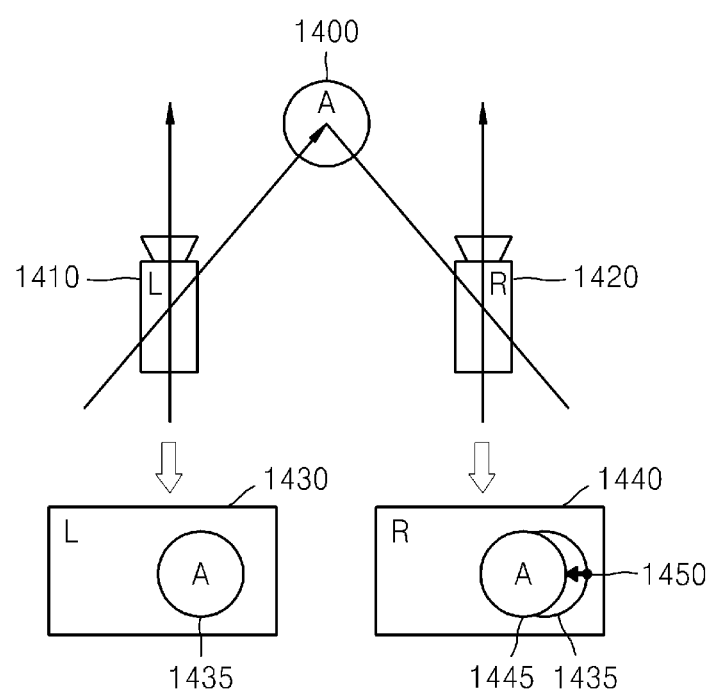
FIG. 14 illustrates an example of binocular parallax that occurs according to disparity between different-view images according to an exemplary embodiment.
Figure 15:
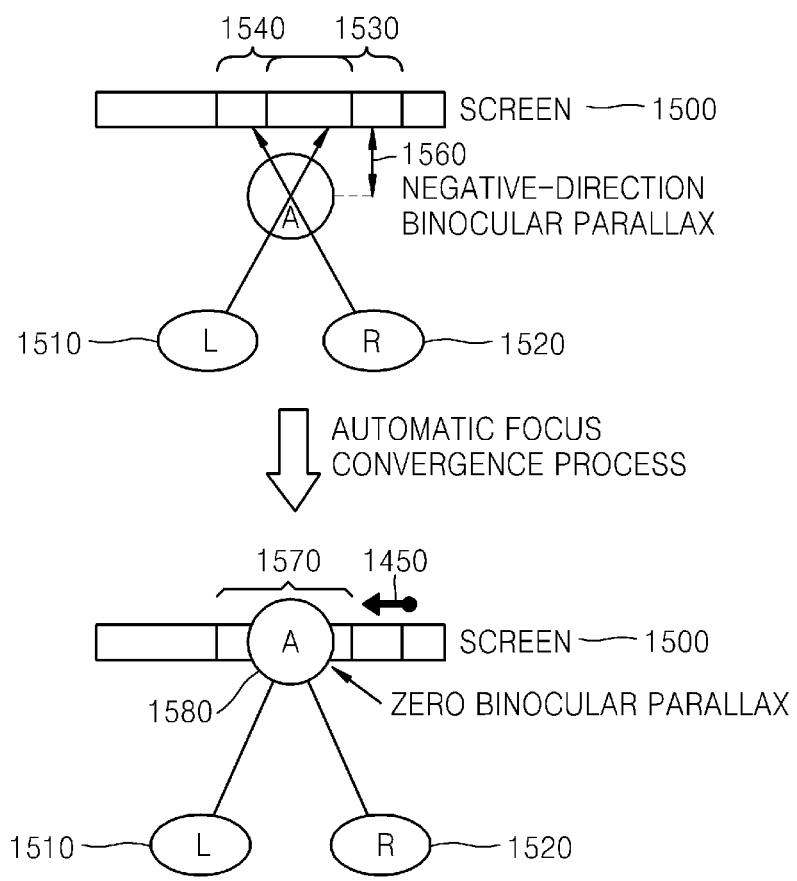
FIG. 15 illustrates an automatic focus convergence method of adjusting convergence of binocular parallax, by using a disparity vector between different-view images, according to an exemplary embodiment.

FIG. 14 illustrates an example of binocular parallax that occurs according to disparity between different-view images. FIG. 15 illustrates an automatic focus convergence method of adjusting convergence of binocular parallax, by using a disparity vector between different-view images, according to an exemplary embodiment.

When an object 1400 is captured by using parallel 3D cameras 1410 and 1420, a left-view image 1430 is obtained from the left-view camera 1410, and a right-view image 1440 is obtained from the right-view camera 1420. An image of the object 1400 is formed in a left-view area 1435 of the left-view image 1430 by the left-view camera 1410, and is formed in a right-view area 1445 of the right-view image 1440 by the right-view camera 1420. If a left-view is a reference view, disparity 1450 occurs between the left-view area 1435 and the right-view area 1445, with respect to the left-view area 1435 of the object 1400.

When the left-view image 1430 and the right-view image 1440 are three-dimensionally reproduced in a screen 1500, the left-view area 1435 of the object 1400 is positioned in a left-view object area 1530 on the screen 1500, and the right-view area 1445 of the object 1400 is positioned in a right-view object area 1540 on the screen 1500. Since a user usually focuses the screen 1500, a focus is accommodated.

Due to the disparity 1450 between the left-view area 1435 and the right-view area 1445 of the object 1400, convergence occurs at a cross point of a gaze of a user's left-eye 1510 viewing the left-view object area 1530 on the screen 1500 and a gaze of a user's right-eye 1520 viewing the right-view object area 1540 on the screen 1500, so that the user may sense that the object 1400 is positioned at the cross point of the gazes of the left-eye 1510 and the right-eye 1520.

Thus, a mismatch occurs between a position of a focus at which focuses of the left-eye 1510 and the right-eye 1520 of the user are accommodated to be formed on the screen 1500, and a position at which the gazes of the left-eye 1510 and the right-eye 1520 of the user are converged, such that negative-direction binocular parallax 1560 occurs. Thus, the user may sense that the object 1400 protrudes by the negative-direction binocular parallax 1560, compared to the screen 1500. Since the negative-direction binocular parallax 1560 has a convergence angle greater than positive-direction binocular parallax, the user may further feel fatigue.

However, as described above, the multiview still image service receiving apparatus 200 may perform an automatic focus convergence operation based on a reference object disparity parameter. The multiview still image service receiving apparatus 200 may adjust the disparity 1450 of the object 1400 to 0 in the automatic focus convergence operation. By doing so, a focus area 1570 of the left-eye 1510 and the right-eye 1520 of the user, which is with respect to the object 1400, may be correctly formed on the screen 1500, and a cross point 1580 of the gazes of the left-eye 1510 and the right-eye 1520 which view the left-view object area 1530 and the right-view object area 1540 on the screen 1500 may be adjusted to be positioned on the screen 1500, so that a focus accommodation position and a focus convergence position matches each other, and thus binocular parallax may be removed.

The number of stereo-pair parameters (NumOfStereoPair) of the 3D additional attribute information may include information about the total number of views that form a stereo pair with a current view image from among multiple view images forming a multiview still image.

The paired view index parameter (PairedViewId[i]), the current view reproduction width parameter (CurCropSizeX[i]), the current view reproduction height parameter (CurCropSizeY[i]), the current view reproduction horizontal offset parameter (CurCropOffsetX[i]), the current view reproduction vertical offset parameter (CurCropOffsetY[i]), the paired view reproduction horizontal parameter (PairedCropSizeX[i]), the paired view reproduction vertical parameter (PairedCropSizeY[i]), the paired view reproduction horizontal offset parameter (PairedCropOffsetX[i]), and the paired view reproduction vertical offset parameter (PairedCropOffsetY[i]) of the 3D additional attribute information may be related to automatic focus convergence and may include information to support the automatic focus convergence operation by the multiview still image service receiving apparatus 200.

The paired view index parameter (PairedViewId[i]) may include information about a view index of a paired view image that forms a stereo pair with the current view image from among the multiple view images forming the multiview still image. An index order may be determined according to disparity between views. For example, the index order may be determined in an order of a small stereoscopic effect due to a small disparity.

The current view reproduction width parameter (CurCropSizeX[i]) and the current view reproduction height parameter (CurCropSizeY[i]) may respectively include information about a width and a height of a reproduction image of the current view image. The current view reproduction horizontal offset parameter (CurCropOffsetX[i]) and the current view reproduction vertical offset parameter (CurCropOffsetY[i]) may respectively include information about horizontal and vertical coordinates of the reproduction image of the current view image.

The paired view reproduction horizontal parameter (PairedCropSizeX[i]) and the paired view reproduction vertical parameter (PairedCropSizeY[i]) may respectively include information about a width and a height of a reproduction image of a paired view image. However, the paired view reproduction horizontal parameter (PairedCropSizeX[i]) and the paired view reproduction vertical parameter (PairedCropSizeY[i]) may be replaced by the current view reproduction width parameter (CurCropSizeX[i]) and the current view reproduction height parameter (CurCropSizeY[i]), and thus may be omitted.

The paired view reproduction horizontal offset parameter (PairedCropOffsetX[i]) and the paired view reproduction vertical offset parameter (PairedCropOffsetY[i]) may respectively include information about horizontal and vertical coordinates of the reproduction image of the paired view image.

Figure 16:
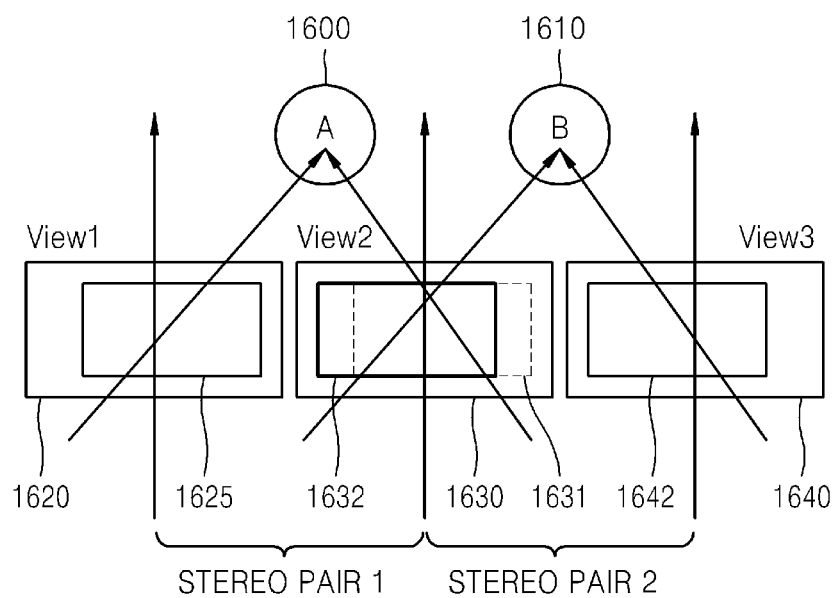
FIG. 16 illustrates examples of a plurality of stereo pairs that are available from among multiple view images forming a multiview still image according to an exemplary embodiment.

FIG. 16 illustrates examples of a plurality of stereo pairs that are available from among multiple view images forming a multiview still image according to an exemplary embodiment.

The multiview still image service receiving apparatus 200 may read information about the total number of views that form a stereo pair with a current view image, and a paired view index forming a stereo pair, may selectively restore paired view images that form the stereo pair with the current view image, and thus may three-dimensionally reproduce the multiple view images that form the stereo pair.

Also, when the multiview still image service receiving apparatus 200 restores and reproduces the multiple view images, the multiview still image service receiving apparatus 200 may crop and then may reproduce a partial area of the multiple view images, or may shift a reproduction area to a desired area and then may reproduce the multiple view images.

When a first view image View1 1620, a second view image View2 1630, and a third view image View3 1640 form a multiview still image, the first view image View1 1620 and the second view image View2 1630 may form a first stereo pair, and the second view image View2 1630 and the third view image View3 1640 may form a second stereo pair.

In the first stereo pair, an image of an object 1600 is formed in an area 1625 of the first view image View1 1620 and is formed in an area 1631 of the second view image View2 1630. However, in the second stereo pair, an image of an object 1610 is formed in an area 1632 of the second view image View2 1630 and is formed in an area 1642 of the third view image View3 1640.

Thus, if the area 1631 is determined as an output area because an automatic focus convergence operation is performed on the second view image View2 1630 with respect to the first stereo pair, when the second view image View2 1630 forms the second stereo pair, the object 1610 may not be three-dimensionally reproduced.

Thus, in order to determine an output area of the current view image, a current stereo pair from among the available stereo pairs of the current view image is detected, to perform an automatic focus convergence operation on the current view image and a paired view image which form the current stereo pair, and then to determine output areas of the current view image and the paired view image.

Thus, the multiview still image service receiving apparatus 200 may search for a desired stereo pair of the current view image, may perform the automatic focus convergence operation, may determine an optimal reproduction image of the current view image and the paired view image which form the current stereo pair, and thus may reproduce the optimal reproduction image, according to the paired view index parameter (PairedViewId[i]), the current view reproduction width parameter (CurCropSizeX[i]), the current view reproduction height parameter (CurCropSizeY[i]), the current view reproduction horizontal offset parameter (CurCropOffsetX[i]), the current view reproduction vertical offset parameter (CurCropOffsetY[i]), the paired view reproduction horizontal parameter (PairedCropSizeX[i]), the paired view reproduction vertical parameter (PairedCropSizeY[i]), the paired view reproduction horizontal offset parameter (PairedCropOffsetX[i]), and the paired view reproduction vertical offset parameter (PairedCropOffsetY[i]).

Figure 17:
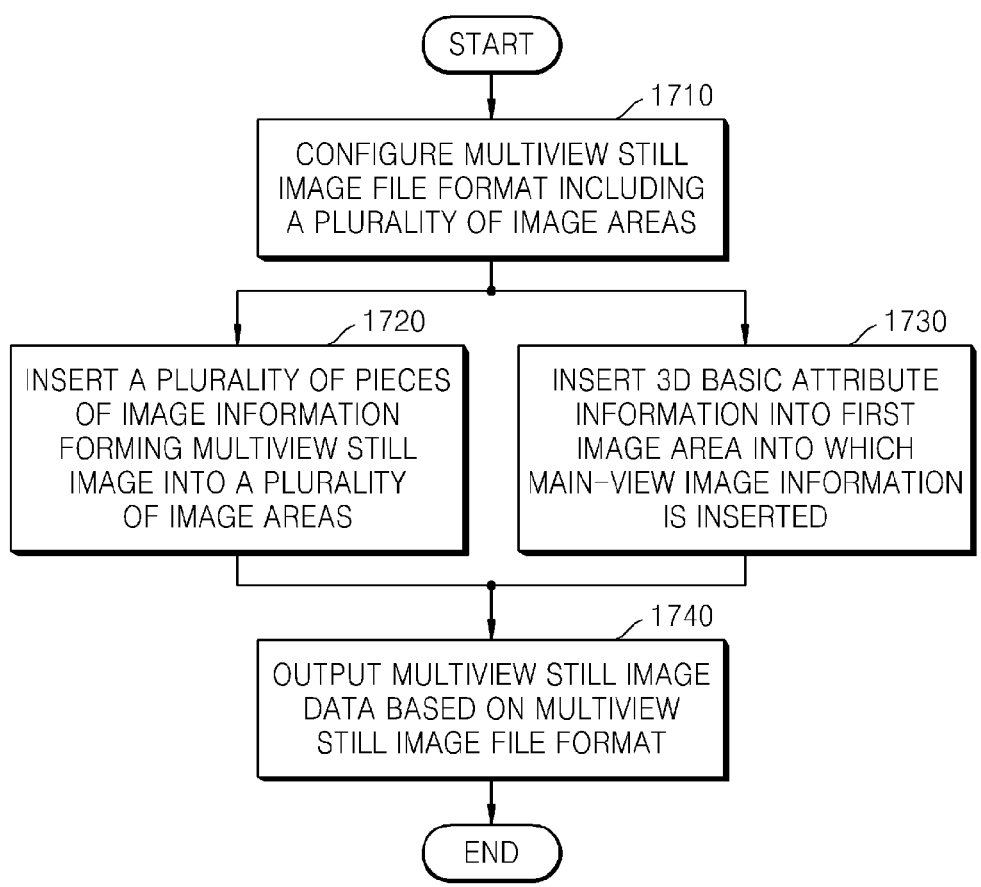
FIG. 17 is a flowchart of a method of providing a multiview still image service, according to an exemplary embodiment.

FIG. 17 is a flowchart of a method of providing a multiview still image service, according to an exemplary embodiment.

In operation 1710, a multiview still image file format including a plurality of image areas into which a plurality of pieces of image information forming a multiview still image are inserted may be configured. Each of the image areas of the multiview still image file format may include an image information area and a plurality of additional information areas.

In operation 1720, the plurality of pieces of image information forming the multiview still image are respectively inserted into the image areas of the multiview still image file format. Main-view image information among the plurality of pieces of image information forming the multiview still image may be inserted into a first image area of the image areas of the multiview still image file format.

In operation 1730, various types of attribute information about the plurality of pieces of image information that are inserted into the image areas of the multiview still image file format may be inserted into the image areas of the multiview still image file format.

3D basic attribute information for 3D reproduction of the multiview still image may be inserted into the first image area of the multiview still image file format. The image areas of the multiview still image file format may further include supplementary additional information areas in addition to a first additional information area into which EXIF information is inserted.

In an exemplary embodiment, the 3D basic attribute information may be inserted into the supplementary additional information areas in addition to the first additional information area of the first image area. In another exemplary embodiment, the 3D basic attribute information may be inserted into the first additional information area of the first image area. In another exemplary embodiment, the 3D basic attribute information may be inserted into every first additional information area of the image areas.

Area offset information may be inserted into the first image area of the multiview still image file format. The area offset information may be inserted into an additional information area of the first image area into which the 3D basic attribute information is inserted.

3D additional attribute information with respect to each image information may be inserted into each of the image areas. The 3D additional attribute information with respect to current image information may be inserted into the supplementary additional information area in addition to the additional information area into which the 3D basic attribute information is inserted.

In operation 1740, multiview still image data, which includes the plurality of pieces of image information and the various types of attribute information which form the multiview still image based on the multiview still image file format, is output.

Figure 18:
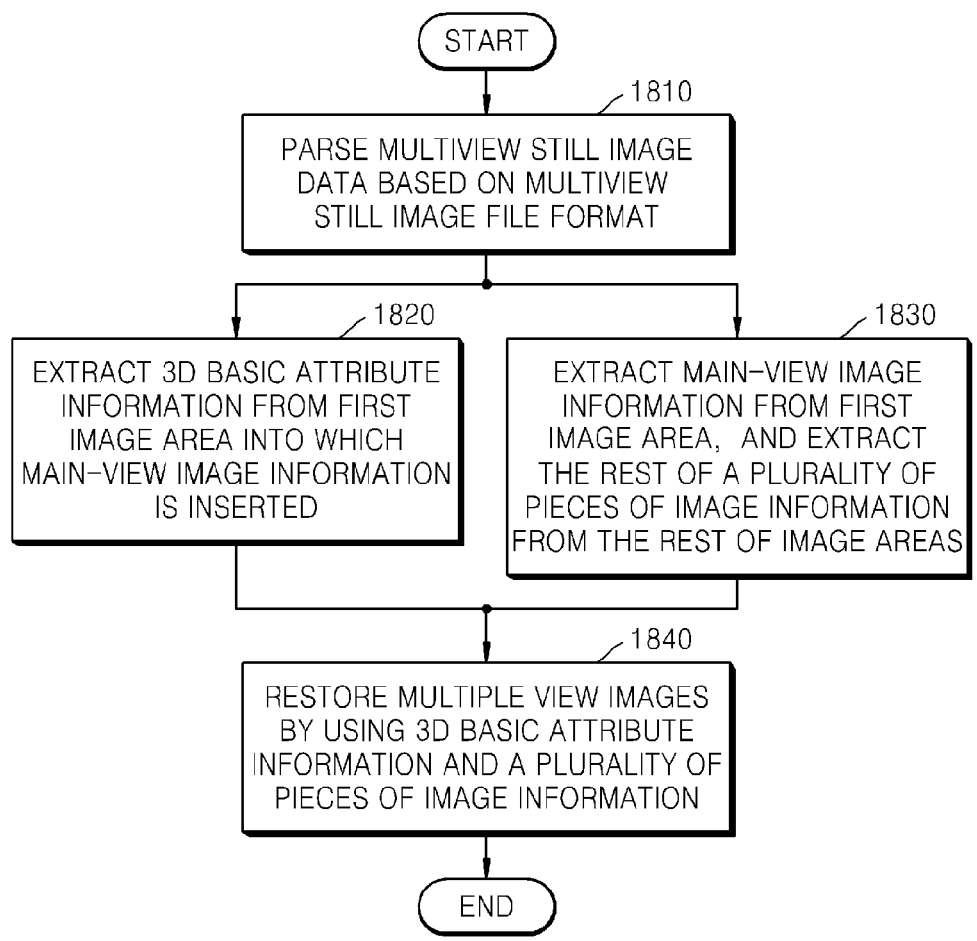
FIG. 18 is a flowchart of a method of receiving a multiview still image service, according to an exemplary embodiment.

FIG. 18 is a flowchart of a method of receiving a multiview still image service, according to an exemplary embodiment.

In operation 1810, multiview still image data based on a multiview still image file format including a plurality of image areas is received and parsed.

In operation 1820, 3D basic attribute information is extracted from a first image area of the image areas of the multiview still image data.

Area offset information may be extracted from the first image area of the multiview still image data. The rest of the image areas except for the first image area may be searched for based on the area offset information, so that the rest of a plurality of pieces of image information except for various types of attribute information and main-view image information may be extracted. The area offset information may be extracted from an additional information area of the first image area into which the 3D basic attribute information is inserted.

In an exemplary embodiment, the 3D basic attribute information may be extracted from a supplementary additional information area in addition to a first additional information area into which EXIF information is inserted.

In another exemplary embodiment, the 3D basic attribute information may be extracted from the first additional information area into which the EXIF information is inserted. In this case, the 3D basic attribute information may be extracted from the first additional information area of each of the image areas.

3D additional attribute information about current image information from among the plurality of pieces of image information may be extracted from each of the image areas. The 3D additional attribute information about the current image information may be extracted from the supplementary additional information area in addition to the additional information area of each of the image areas into which the 3D basic attribute information is inserted.

In operation 1830, the plurality of pieces of image information forming a multiview still image may be extracted from the image areas of the multiview still image data.

The main-view image information may be extracted from the first image area, and the rest of the plurality of pieces of image information except for the main-view image information may be extracted from the rest of the image areas except for the first image area.

In operation 1840, multiple view images forming the multiview still image may be restored by using the 3D basic attribute information, the 3D additional attribute information, and the plurality of pieces of image information. Based on the 3D basic attribute information and the 3D additional attribute information, the multiple view images forming the multiview still image may be restored and three-dimensionally reproduced.

Figure 19:
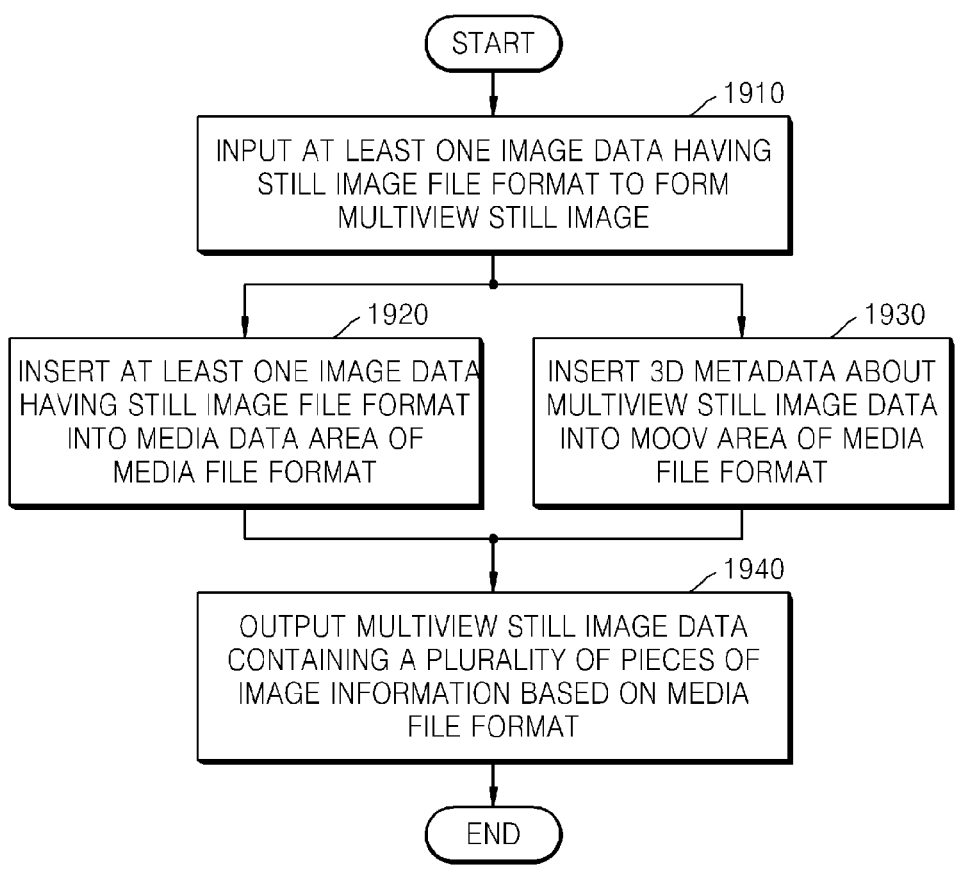
FIG. 19 is a flowchart of a method of providing a multiview still image service based on a media file format, according to an exemplary embodiment.

FIG. 19 is a flowchart of a method of providing a multiview still image service based on a media file format, according to an exemplary embodiment.

In operation 1910, at least one image data having a still image file format into which a plurality of pieces of image information forming a multiview still image are inserted is input. The still image file format may include a JPEG file format. The media file format may include an ISO media file format.

In operation 1920, the at least one image data having the still image file format may be inserted into a media data area of the media file format. Image data, which has a still image file format that is one of a side-by-side format and a top and bottom format and includes a 3D image, may be inserted into the media data area of the media file format. Also, two or more pieces of image data, which have a still image file format that is one of a frame sequential format and a field sequential format and include 3D image data, may be inserted into the media data area of the media file format.

In operation 1930, 3D metadata containing information used to three-dimensionally reproduce multiview still image data is inserted into a moov area of the media file format. The 3D metadata about the multiview still image data may include information about a 3D image format of the image data that is inserted into the media data area and that has the still image file format, and information about an arrangement of views of the multiview still image. Image data offset information, which indicates a start position of the image data having the still image file format inserted into the media data area, may be inserted into the moov area of the media file format.

The 3D basic attribute information and the 3D additional attribute information, as the 3D metadata, may be inserted into the media information area that is a lower area of a track area of the media file format.

In operation 1940, the multiview still image data containing the plurality of pieces of image information may be output based on the media file format.

Figure 20:
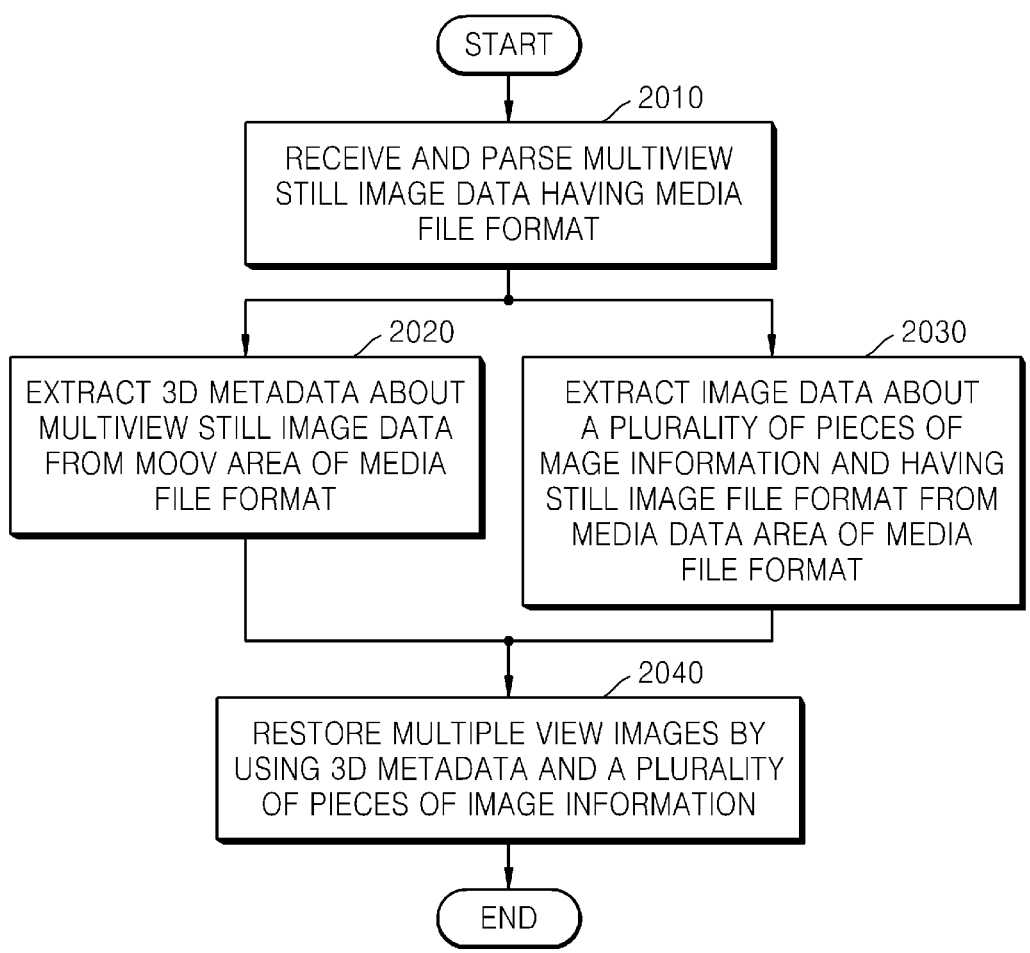
FIG. 20 is a flowchart of a method of receiving a multiview still image service based on a media file format, according to an exemplary embodiment.

FIG. 20 is a flowchart of a method of receiving a multiview still image service based on a media file format, according to an exemplary embodiment.

In operation 2010, multiview still image data having a media file format may be received and parsed. The multiview still image data having the media file format may be parsed, and thus a media data area and a moov area of the media file format may be searched for.

In operation 2020, 3D metadata about a multiview still image may be extracted from the moov area of the multiview still image data. The 3D metadata may include information to restore multiple view images forming a multiview still image and then to three-dimensionally reproduce them.

In operation 2030, at least one image data having a still image file format may be extracted from the media data area of the multiview still image data. The at least one image data having the still image file format may contain image information about the multiple view images that form the multiview still image.

In operation 2040, the multiple view images that form the multiview still image may be restored by using the extracted 3D metadata and a plurality of pieces of image information. The multiple view images that are restored by using the extracted 3D metadata and the plurality of pieces of image information may be correctly reproduced in a 3D manner.

The block diagrams according to exemplary embodiments may be understood by those of ordinary skill in the art as being conceptual forms of circuits to implement principles of exemplary embodiments. Similarly, it will be understood by those of ordinary skill in the art that random flowcharts, flowcharts, state transition diagrams, pseudo codes, and the like indicate various processes that are expressed in a computer-readable medium and thus are to be executed by a computer or a processor. Thus, exemplary embodiments may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

Operations of various elements shown in the drawings may be provided by using hardware to execute software related to the hardware or by using dedicated hardware. When the various elements are provided by a processor, the operations thereof may be provided by a single dedicated processor, a single shared-processor, or a plurality of sharable and individual processors. Also, the terms "processor" or "control unit" do not mean that hardware to execute software is only used and thus may imply digital signal processor (DSP) hardware, a read-only memory (ROM) to store software, a random access memory (RAM), and a non-volatile storage device.

In the following claims, an element to execute a particular operation may include random operations to perform the particular operation, and may include a combination of circuit elements to perform the particular operation, or software that is combined with an appropriate circuit to perform the particular operation and that includes firmware, microcodes, and the like.

In the specification, various changes in exemplary embodiments related to aspects mean that a particular characteristic, a particular structure, a particular performance, and the like related to an embodiment are included in at least one embodiment of the concepts of the present invention. Thus, the expression "exemplary embodiment," and other modified exemplary embodiments throughout the specification do not necessarily indicate the same exemplary embodiment.

In the specification, the term "and/or" includes any and all combinations of one or more of the associated listed items. Also, expressions such as "at least one of," when preceding a list of elements, modify the entire list of elements and do not modify the individual elements of the list.

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the invention is defined not by the detailed description of exemplary embodiments, but by the appended claims, and all differences within the scope will be construed as being included in the present invention.

The invention claimed is:

1. A method of providing a multiview still image service, the method comprising:
configuring a multiview still image file format comprising a plurality of image areas;
inserting a plurality of pieces of image information corresponding to a multiview still image into the plurality of image areas, respectively;
inserting three-dimensional (3D) basic attribute information to three-dimensionally reproduce the multiview still image into a first image area of the plurality of image areas; and
outputting multiview still image data comprising the plurality of pieces of image information based on the multiview still image file format,
wherein main-view image information from among the plurality of pieces of image information is inserted into the first image area, and wherein the 3D basic attribute information includes information regarding a value of total viewpoints of the multiview still image, and the information regarding the value of total viewpoints of the multiview still image includes a total number of image area offset information, and wherein the first image area comprises encoded image data.

2. A non-transitory computer-readable recording medium having recorded thereon a program for executing the method of claim 1, by using a computer.

3. The method of claim 1, further comprising:
inserting area offset information into an additional information area of the first image area into which the 3D basic attribute information is inserted,
wherein the area offset information indicates a start position of each of the plurality of image areas, and
wherein the area offset information is information for extracting remaining pieces of image information, other than the main-view image information, from remaining image areas, other than the first image area.

4. The method of claim 1, wherein the inserting the 3D basic attribute information comprises inserting the 3D basic attribute information into a supplementary additional information area of the first image area, distinct from a first additional information area into which Exchangeable Image File Format (EXIF) information is inserted.

5. The method of claim 1, wherein the inserting the 3D basic attribute information comprises inserting the 3D basic attribute information into a first additional information area of the plurality of image areas.

6. The method of claim 1, further comprising inserting 3D additional attribute information about current image information, from among the plurality of pieces of image information, into a supplementary additional information area of each of the plurality of image areas, distinct from an additional information area into which the 3D basic attribute information is inserted.

7. The method of claim 1, wherein the 3D basic attribute information comprises information about a horizontal value and a vertical value of an aspect ratio of an original image of a predetermined view image from among the multiple view images that form the multiview still image.

8. The method of claim 1, wherein, when one or more stereo pairs formed by the plurality of pieces of image information comprise a stereo pair having depth information between different views, the 3D basic attribute information comprises multipath information indicating the stereo pair having depth information between views that correspond to sizes of reproducing apparatuses.

9. A method of receiving a multiview still image service, the method comprising:
receiving and parsing multiview still image data based on a multiview still image file format comprising a plurality of image areas;
extracting 3D basic attribute information to three-dimensionally reproduce a multiview still image from a first image area of the plurality of image areas; and
extracting main-view image information, from among a plurality of pieces of image information forming the multiview still image, from the first image area, and extracting remaining pieces of image information of the plurality of pieces of image information from remaining image areas of the plurality of image areas, respectively,
wherein the main-view image information is inserted into the first image area, wherein the 3D basic attribute information includes information regarding a value of total viewpoints of the multiview still image, and the information regarding the value of total viewpoints of the multiview still image includes a total number of image area offset information, and wherein the first image area comprises encoded image data.

10. The method of claim 9, further comprising restoring and three-dimensionally reproducing multiple view images that form the multiview still image, by using the extracted 3D basic attribute information and the plurality of pieces of extracted image information.

11. The method of claim 9, further comprising:
extracting area offset information from an additional information area of the first image area into which the 3D basic attribute information is inserted,
wherein the area offset information indicates a start position of each of the plurality of image areas, and
wherein the extracting the remaining pieces of image information comprises extracting the remaining pieces of image information from the remaining image areas which are determined based on the area offset information.

12. The method of claim 9, wherein the extracting the 3D basic attribute information comprises extracting the 3D basic attribute information from a supplementary additional information area of the first image area, distinct from a first additional information area into which Exchangeable Image File Format (EXIF) information is inserted.

13. The method of claim 9, wherein the extracting the 3D basic attribute information comprises extracting the 3D basic attribute information from a first additional information area of the plurality of image areas.

14. The method of claim 9, further comprising extracting 3D additional attribute information about current image information, from among the plurality of pieces of image information, from a supplementary additional information area of each of the plurality of image areas, distinct from an additional information area into which the 3D basic attribute information is inserted.

15. The method of claim 14, wherein the 3D additional attribute information comprises information about a size of an occlusion area that occurs at a boundary of a current view image of the current image information in comparison to a reference view image, and information about a direction of the boundary at which the occlusion area occurs.

16. The method of claim 14, wherein the 3D additional attribute information comprises at least one of:
information about a number of pieces of image information which form a stereo pair with a current view image of the current image information from among the plurality of pieces of image information, information about a view index of at least one paired view image forming the stereo pair, information about a width and a height of a reproduction image of the current view image which is used to adjust a binocular parallax between the current view image and a paired view image which form the stereo pair, information about horizontal and vertical coordinates of the reproduction image of the current view image, and information about horizontal and vertical coordinates of a reproduction image of the at least one paired view image.

17. The method of claim 9, wherein the 3D basic attribute information comprises information about a horizontal value and a vertical value of an aspect ratio of an original image of a predetermined view image from among the multiple view images that form the multiview still image.

18. The method of claim 9, wherein, when one or more stereo pairs formed by the plurality of pieces of image information comprise a stereo pair having depth information between different views, the 3D basic attribute information comprises multipath information indicating the stereo pair having depth information between views that correspond to sizes of reproducing apparatuses.

19. A non-transitory computer-readable recording medium having recorded thereon a program for executing the method of claim 9, by using a computer.

20. A multiview still image service providing apparatus comprising at least one hardware processor configured to implement:
    a multiview still image file format configuring unit which configures a multiview still image file format comprising a plurality of image areas;
    an image information inserting unit which inserts a plurality of pieces of image information corresponding to a multiview still image into the plurality of image areas, respectively;
    an attribute information inserting unit which inserts 3D basic attribute information to three-dimensionally reproduce the multiview still image into a first image area of the plurality of image areas; and
    an output unit which outputs multiview still image data comprising the plurality of pieces of image information based on the multiview still image file format,
    wherein main-view image information from among the plurality of pieces of image information is inserted into the first image area,
    wherein the 3D basic attribute information includes information regarding a value of total viewpoints of the multiview still image, and the information regarding the value of total viewpoints of the multiview still image includes a total number of image area offset information, and
    wherein the first image area comprises encoded image data.

21. A multiview still image service receiving apparatus comprising at least one hardware processor configured to implement:
    a receiving and parsing unit which receives and parses multiview still image data based on a multiview still image file format comprising a plurality of image areas;
    an attribute information extracting unit which extracts 3D basic attribute information to three-dimensionally reproduce a multiview still image from a first image area of the plurality of image areas;
    an image information extracting unit which extracts main-view image information, from among a plurality of pieces of image information forming the multiview still image, from the first image area, and extracts remaining pieces of image information from among the plurality of pieces of image information from remaining image areas of the plurality of image areas, respectively; and
    an image restoring unit which restores multiple view images that form the multiview still image, by using the extracted 3D basic attribute information and the plurality of pieces of extracted image information,
    wherein the main-view image information is inserted into the first image area,
    wherein the 3D basic attribute information includes information regarding a value of total viewpoints of the multiview still image, and the information regarding the value of total viewpoints of the multiview still image includes a total number of image area offset information, and
    wherein the first image area comprises encoded image data.

22. A method of providing a media file format-based multiview still image service, the method comprising:
    inserting at least one image data having a still image file format into a media data area of a media file format;
    inserting 3D metadata comprising information to three-dimensionally reproduce multiview still image data into a moov area, distinct from the media data area, of the media file format; and
    outputting the multiview still image data comprising a plurality of pieces of image information based on the media file format,
    wherein the still image file format is a format into which the plurality of pieces of image information corresponding to a multiview still image are inserted, and
    wherein 3D basic attribute information included in the media data area includes information regarding a value of total viewpoints of the multiview still image, and the information regarding the value of total viewpoints of the multiview still image includes a total number of image area offset information.

23. A non-transitory computer-readable recording medium having recorded thereon a program for executing the method of claim 22, by using a computer.

24. A method of receiving a media file format-based multiview still image service, the method comprising:
    receiving and parsing multiview still image data based on a media file format;
    extracting 3D metadata from a moov area of the media file format;
    extracting at least one image data that has a still image file format and comprises image information about multiple view images corresponding to a multiview still image, from a media data area, distinct from the moov area, of the media file format; and
    restoring the multiple view images corresponding to the multiview still image, by using the extracted 3D metadata and the plurality of pieces of extracted image information,
    wherein the 3D metadata comprises information to restore the multiple view images corresponding to the multiview still image and to three-dimensionally reproduce the multiple view images, and
    wherein 3D basic attribute information included in the media data area includes information regarding a value of total viewpoints of the multiview still image, and the information regarding the value of total viewpoints of the multiview still image includes a total number of image area offset information.

25. A non-transitory computer-readable recording medium having recorded thereon a program for executing the method of claim 24, by using a computer.

* * * * *